(12) United States Patent
Foo

(10) Patent No.: US 9,014,183 B2
(45) Date of Patent: Apr. 21, 2015

(54) BUFFER TRANSFER SERVICE

(75) Inventor: Edwin W. Foo, San Mateo, CA (US)

(73) Assignee: Apple Inc., Cupertino, CA (US)

( * ) Notice: Subject to any disclaimer, the term of this patent is extended or adjusted under 35 U.S.C. 154(b) by 358 days.

(21) Appl. No.: 13/480,202

(22) Filed: May 24, 2012

(65) Prior Publication Data

US 2013/0315235 A1 Nov. 28, 2013

(51) Int. Cl.
*H04L 12/28* (2006.01)
*H04L 29/08* (2006.01)

(52) U.S. Cl.
CPC .............. *H04L 67/06* (2013.01); *H04L 67/146* (2013.01)

(58) Field of Classification Search
CPC . H04N 7/163; H04N 21/482; H04N 21/4314; H04N 17/04; H04N 21/8166; H04N 21/25891; H04N 21/4882; H04N 21/8549; H04N 21/262; H04N 21/4782; H04N 5/4401; H04N 21/47; H04N 21/4622; H04N 21/47202; H04N 21/43
USPC ......... 370/203, 204–215, 229–240, 310–394, 370/395.1, 395.3, 395.4, 395.41, 395.42, 370/395.5, 395.52, 395.53, 412–421, 370/431–529
See application file for complete search history.

(56) References Cited

U.S. PATENT DOCUMENTS

| | | | |
|---|---|---|---|
| 2005/0154774 A1* | 7/2005 | Giaffreda et al. | 709/200 |
| 2005/0273592 A1* | 12/2005 | Pryor et al. | 713/150 |
| 2006/0020982 A1* | 1/2006 | Jerding et al. | 725/89 |
| 2007/0058656 A1* | 3/2007 | Breslow et al. | 370/437 |
| 2008/0189365 A1* | 8/2008 | Narayanaswami et al. | 709/204 |
| 2009/0175221 A1* | 7/2009 | Visuri et al. | 370/328 |
| 2009/0271525 A1* | 10/2009 | Jung et al. | 709/231 |
| 2010/0107205 A1* | 4/2010 | Foti | 725/109 |
| 2010/0235528 A1* | 9/2010 | Bocharov et al. | 709/231 |
| 2012/0137332 A1* | 5/2012 | Kumar | 725/62 |
| 2013/0111529 A1* | 5/2013 | Yao et al. | 725/93 |

FOREIGN PATENT DOCUMENTS

EP 0984600 A2 3/2000

OTHER PUBLICATIONS

International Search Report and Written Opinion mailed Jul. 4, 2013 in PCT/US2013/039333, 11 pages.

* cited by examiner

*Primary Examiner* — Jung-Jen Liu
(74) *Attorney, Agent, or Firm* — Kilpatrick Townsend & Stockton LLP

(57) ABSTRACT

A buffer transfer session can be used to send a data object from one device to another using a low-overhead, reliable point-to-point data transfer protocol. In response to a request to transfer a data object to the receiving device, the sending device can locate the requested data object and establish a first buffer transfer session to transfer the data object to the receiving device. The buffer transfer session can be assigned a unique session identifier. The sending device can send the data object as a sequence of packets, each including the session identifier and a portion of the data object. Multiple buffer transfer sessions can be established concurrently between the two devices. In some instances, transfers can be paused and resumed, canceled, switched to a different transport, or persisted across disconnection/reconnection events.

24 Claims, 10 Drawing Sheets

BUFFER TRANSFER SERVICE

BACKGROUND

The present disclosure relates in general to communicating data between devices and in particular to a buffer transfer service that manages communication of data objects of known size.

Portable electronic devices can store and provide interactive user access to data objects including media files (audio, video, images) in various formats, documents, artwork files, personal data (e.g., contacts, calendar), forms and so on. Thus, a user can operate a portable electronic device to listen to music, watch movies, view and manage personal information, and so on. In some instances, a portable electronic device can also create data objects, e.g., through audio or video recording, taking photos using still cameras, collecting and processing user input or the like.

Some portable electronic devices can also communicate with various accessories to enhance user interaction with the device. For example, the portable electronic device can be connected to an accessory that has a larger display or more powerful speakers, or a more convenient user interface, than the portable electronic device. Such accessories can be used to present and interact with media content and other information stored on the portable electronic device.

SUMMARY

To support user interaction with a portable electronic device via an accessory (or vice versa), it is sometimes useful to transfer data objects between the device and the accessory. Certain embodiments of the present invention relate to a buffer transfer service that can be invoked to send a data object on request using a low-overhead, reliable point-to-point data transfer protocol between two devices (a sending device and a receiving device, either of which may or may not be what is normally thought of as portable, depending on implementation). For instance, upon receipt of a request to transfer a data object to the receiving device, the sending device can locate the requested data object and establish a first buffer transfer session to transfer the data object to the receiving device. The buffer transfer session can be assigned a unique session identifier to distinguish it from other communication sessions that may be concurrently established, and in some embodiments, multiple buffer transfer sessions can be established concurrently between the two devices, with a different session identifier assigned to each. When the transfer session is established (e.g., when both devices have communicated their readiness to each other), the sending device sends a sequence of packets, each packet including the session identifier and a portion of the data object to be transferred. In some embodiments, the packets can also include additional information, such as a sequence number or other unique packet identifier that is usable by the sending and receiving devices to determine which portions of the data object have been transferred, error detection and/or error correction codes usable by the recipient to detect errors in received packets, etc. In some embodiments, transfers can be paused and resumed under control of the recipient. In some embodiments, an in-progress transfer can be persisted across disconnection and reconnection events.

Certain aspects of the invention relate to methods for transferring data between a first device and a second device. The first device (a sender device) can establish a point-to-point communication link with the second device (a recipient device) and can receive an instruction to send a first data object to the second device. For example, the second device can send a request for the first data object via the point-to-point link. The first device can locate the first data object, assign a first unique identifier for a first transfer session, and send to the second device (via the point-to-point communication link) a first send-ready message including the first unique identifier. The send-ready message can also include other information, such as an identifier of the first data object and/or information indicating the size of the first data object. After the sender receives a receive-ready message in response to the first send-ready message, the sender can begin to send a first set of packets, each packet in the first set including the first unique identifier and a different portion of the first data object. The first set of packets can include a number of packets sufficient to transfer the entirety of the first data object.

In some embodiments, multiple transfers can be performed concurrently. For example, while sending the first set of packets, the first device can receive an instruction to send a second data object to the second device, locate the second data object, assign a second unique identifier for a second transfer session, and send to the second device (via the point-to-point communication link) a second send-ready message including the second unique identifier. After the first device receives a second receive-ready message responsive to the second send-ready message, the first device can begin to send a second set of packets, each packet in the second plurality of packets including the second unique identifier and a different portion of the second data object. The second set of packets can include a number of packets sufficient to transfer the entirety of the second data object; this might or might not be different from the number of packets in the first set, depending on the sizes of the data object. At least some of the packets of the first set and packets of the second set can be sent in an interleaved fashion on the point-to-point communication link.

In some embodiments, the packets need not include sender device identification or recipient device identification, since the link is point-to-point. The packets also need not include any explicit identification of the content as being a portion of the first data object; the recipient device can infer the content from the presence of the first unique identifier in the packet and the fact that the packets were sent after the session initiation message. Given a fixed upper limit on packet size, this can reduce the overhead associated with the transfer of large data objects by maximizing the space available for data.

Certain aspects of the present invention relate to methods for receiving data from a first device at a second device. The second device can establish a point-to-point communication link with the first device and can receive a send-ready message from the first device via that link. The send-ready message can indicate that the first device is ready to transfer a data object to the second device and can include a session identifier for the transfer of the data object. In some embodiments, the send-ready message may be responsive to a request from the second device to receive the data object. In response to the send-ready message, the second device can send a receive-ready message to the first device, the receive-ready message indicating that the second device is ready to receive the data object. In some embodiments, prior to sending the receive-ready message, the second device can prepare to receive the data object, e.g., by allocating sufficient storage space to store the data object. Subsequently, the second device can receive a set of packets from the first device. In some embodiments, each of these packets includes a header and a payload, with the header including the session identifier and a sequence number that is unique for each packet. Based on the session identifier, the second device can determine that the payload of each of the of packets contains a portion of the data object and can store the payload of each of the packets in a storage medium, with a location for storing the payload of each packet being determined based at least in part on the sequence number of the packet.

In some embodiments, the packets can include error detection and/or error correction codes, and the second device can perform error checking and/or error correction operations on the received packets. If an error is detected, the second device can send a negative-acknowledgement (Nack) packet to the first device; if no error is detected, the second device can send an acknowledgement (Ack) packet. An Ack or Nack packet can be sent for every data packet, or a single Ack or Nack packet can be sent for a group of data packets (such as a subset of consecutive data packets). This can help ensure data integrity.

In some embodiments, while the set of packets for a data object is being received, the second device can send a pause message to the first device to signal the first device to pause in sending the packets and can later send a resume message to the first device to signal the first device to resume sending of the packets. The first device can resume, e.g., at a point determined based on the last Ack packet received before sending was paused.

In some embodiments, when all portions of the data object have been received, the second device can send a done message to the first device to indicate that the transfer is complete.

Certain other aspects of the invention relate to electronic devices that can send data objects to a recipient device. For example, an electronic device can include an interface configured to establish a point-to-point communication link with a recipient device and a processing subsystem coupled to the interface. The processing subsystem can be configured (e.g., through suitable programming) to initiate various sessions including a buffer transfer session configured to transfer a data object to the recipient device over the point-to-point communication link. Each session can have its own unique identifier. The buffer transfer session can be initiated in response to a request for the data object. The request can be generated, for example, by an application program executing in the processing subsystem or by the recipient device. For a buffer transfer session, the processing subsystem can load at least a portion of the data object to be transferred into a buffer and send to the recipient device (via the point-to-point communication link) a send-ready message that includes the unique identifier assigned to the buffer transfer session. The processing subsystem can receive a receive-ready message responsive to the send-ready message. In response to the receive-ready message, the processing subsystem can be configured to send a sequence of packets to the recipient device via the point-to-point communication link. Each packet can include the unique identifier assigned to the buffer transfer session, a sequence number, and a portion of the data object read from the buffer. In some embodiments, the processing system can be configured to define a link layer, and the sending of the data-object packets can be managed by the link layer.

In some embodiments, while sending data-object packets to the recipient device, the sending device can detect that the point-to-point communication link has been lost. If this happens, the sending device can determine whether the transfer of the first data object should be continued on another point-to-point communication link already established with the same recipient device. If so, then sending of packets can be resumed using the other point-to-point communication link; the point at which sending is resumed can be based on the last Ack packet received before the link was lost.

In some embodiments, if the link is lost while sending data-object packets, the sending device can determine that the transfer of the data object should be resumed later and, accordingly, store information indicating current status of the transfer (e.g., in its own local storage medium); this information can be used to resume the transfer of the first data object after the point-to-point communication link to the recipient device is reestablished. Thus, transfer operations can be persistent across disconnect/reconnect events.

Certain other aspects of the invention relate to electronic devices that can receive data objects from a sender device. For example, an electronic device can include an interface configured to establish a point-to-point communication link with a sender device, a storage medium configured to store data, and a processing subsystem coupled to the interface and the storage medium. The processing subsystem can be configured to send a request for a data object to the sender device via the point-to-point communication link and to receive from the sender device (via the point-to-point communication link) a send-ready message indicating that the sender device is ready to send the data object. The send-ready message can include a session identifier associated with transfer of the data object. In response, the processing subsystem can send to the sender device (via the point-to-point communication link) a receive-ready message indicating that the electronic device is ready to receive the data object. Thereafter, the processing subsystem can receive from the sender device (again via the point-to-point communication link) the data object as a sequence of packets generated by the sender device. Each packet in the sequence of packets can be labeled with the session identifier associated with the transfer of the data object and can include a portion of the data object as a payload. The processing subsystem can store the payload of each of the received packets in the storage medium as a portion of the data object. For example, each packet in the sequence of packets can include a sequence number, and a location within the storage medium for storing the payload of each packet can be determined based at least in part on the sequence number of the packet.

The techniques described herein can be implemented in a variety of devices. In some embodiments the sender device can be a portable device, and the recipient device can be an accessory that is interoperable with the portable device. The devices can communicate using physical connections (e.g., wired connections such as can be provided by mating connectors or cables or adapters) and/or wireless connections (e.g., WiFi, Bluetooth, or other radio-frequency connections).

The following detailed description together with the accompanying drawings will provide a better understanding of the nature and advantages of the present invention.

DETAILED DESCRIPTION

Certain embodiments of the present invention relate to a buffer transfer service that can be invoked to send a data object on request using a low-overhead, reliable point-to-point data transfer protocol between two devices (a sending device and a receiving device, either of which may or may not be what is normally thought of as portable, depending on implementation). For instance, upon receipt of a request to transfer a data object to the receiving device, the sending device can locate the requested data object and establish a first buffer transfer session to transfer the data object to the receiving device. The buffer transfer session can be assigned a unique session identifier to distinguish it from other communication sessions that may be concurrently established, and in some embodiments, multiple buffer transfer sessions can be established concurrently between the two devices, with a different session identifier assigned to each. When the transfer session is established (e.g., when both devices have communicated their readiness to each other), the sending device sends a sequence of packets, each packet including the session identifier and a portion of the data object to be transferred. In some embodiments, the packets can also include additional information, such as a sequence number or other unique packet identifier that is usable by the sending and receiving devices to determine which portions of the data object have been transferred, error detection and/or error correction codes usable by the recipient to detect errors in received packets, etc. In some embodiments, transfers can be paused and resumed under control of the recipient. In some embodiments, an in-progress transfer can be persisted across disconnection and reconnection events.

Figure 1:
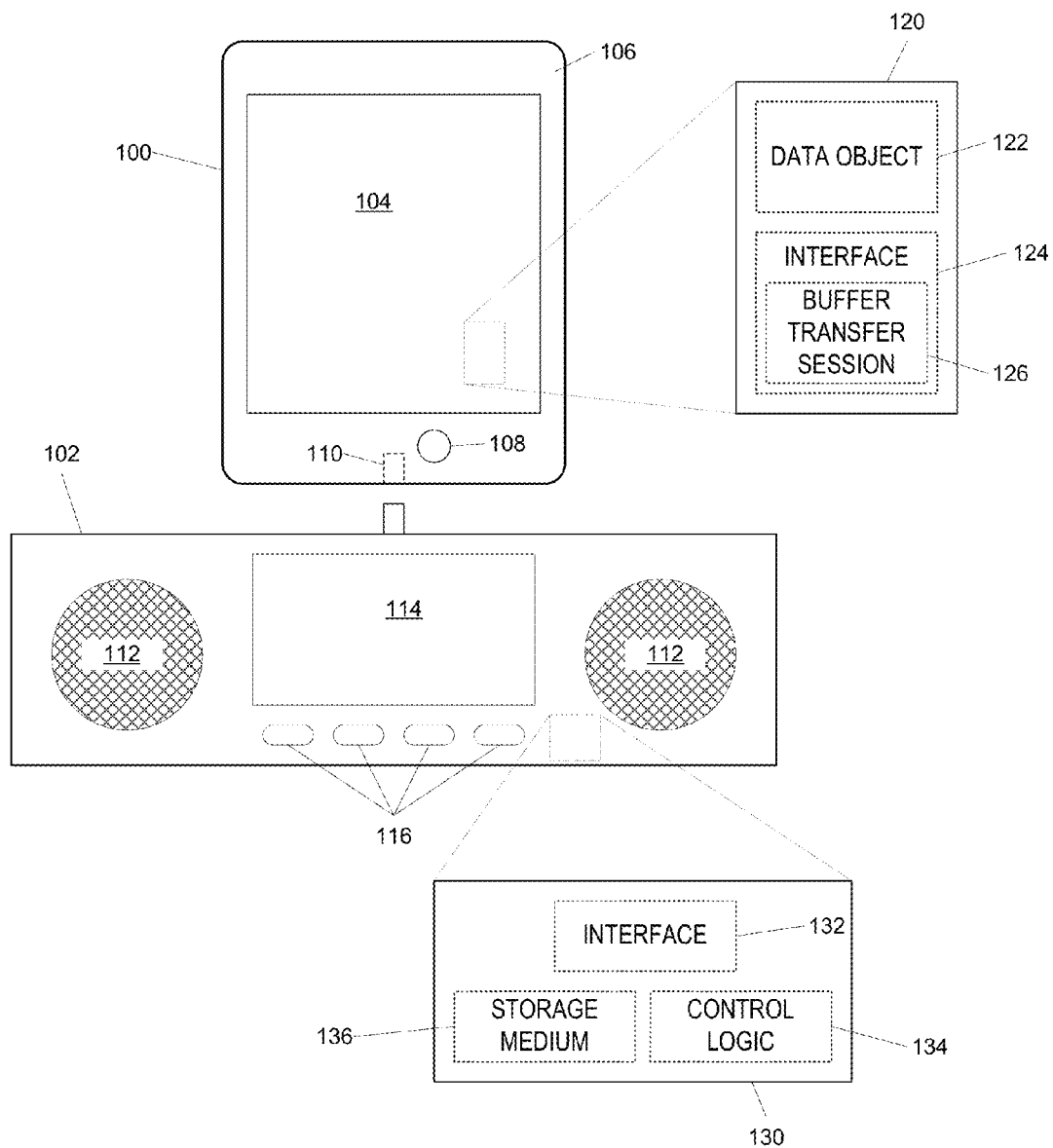
FIG. 1 shows a host device and an accessory according to an embodiment of the present invention.

FIG. 1 shows a host device 100 and an accessory 102 according to an embodiment of the present invention.

Host device 100 can be, for example, a handheld device such as a media player, smart phone, personal digital assistant; a tablet computer; a laptop computer; a desktop computer; or any other electronic device capable of sending data and communicating with other devices. In some embodiments, host device 100 can be a portable device (meaning a device that is easily carried by a user from place to place), but this is not required. In the example shown, host device 100 is a tablet computer with a display area 104 surrounded by bezel 106 and a control button 108. A receptacle connector 110 is provided at the bottom of host device 100 (e.g., recessed into the housing) to allow accessories to connect to host device 100.

Accessory 102 can be any accessory capable of interacting with host device 102, such as a speaker dock or speaker system, a media console, an automobile head unit, or the like. Accessory 102 can have various user-interface components such as speakers 112, display 114, and user-operable controls 116. In the example shown, accessory 102 has a plug connector 118 that can be inserted into receptacle connector 110 to provide electrical and mechanical connections between accessory 102 and host device 100. In some embodiments, the electrical connections can include both power and data connections, allowing accessory 102 to deliver power to host device 100 and/or to receive power from host device 100. While a direct connection between connectors 110 and 118 is indicated, it is to be understood that some embodiments can use an indirect connection, e.g., via a cable or adapter. In some embodiments, host device 100 and accessory 102 may be capable of communicating wirelessly, e.g., using radio-frequency communication technology such as WiFi or Bluetooth, near-field communication technology, infrared communication or the like, in addition to or instead of a wired signal path as provided by connectors 110 and 118. In some embodiments, multiple communication paths can be concurrently established between host device 100 and accessory 102, with different types of information being selectively routed over different paths.

As shown in inset 120, host device 100 can store various data objects, such as data object 122. Examples of data objects include audio files, video files, image files, artwork files, data files such as documents and e-mail messages, personal information records such as contact information or calendar appointments, and so on. An accessory interface 124 can provide a buffer transfer session 126 to facilitate communicating data object 122 to accessory 102; specific examples are described below.

As shown in inset 130, accessory 102 can have a host interface 132 that is compatible with accessory interface 124 of host device 100. Control logic 134 can operate host interface 132 to send and receive communications to and from host device 100. Control logic 134 can also operate other components of accessory 102, e.g., in response to instructions received from host device 100 or in response to user input received via controls 116, and can send messages to host device 100 via interface 132, e.g., based on user input. Storage medium 136 can store various data objects, including data objects transferred from host device 100.

For example, control logic 134 of accessory 102 can generate a request to receive a data object (e.g., data object 122) from host device 100. In one specific example, accessory 102 can stream audio from host device 100 and present the audio through speakers 112; while streaming the audio, accessory 102 can request an artwork or image file associated with the audio, for presentation on display 114. In this example, control logic 134 can communicate with host device 100 via interface 132 to determine what files are available, then request a file (e.g., data object 122), again by communicating via interface 132. In response to the request, interface 124 of host device 100 can initiate buffer transfer session 126 to transfer data object 122 to accessory 102; accessory 102 can store data object 122 in storage medium 136 and perform additional operations using data object 122, e.g., displaying an artwork or image file on display 114.

It will be appreciated that the host device and accessory of FIG. 1 are illustrative and that variations and modifications are possible. A host device and/or an accessory can implement any combination of functionality. A buffer transfer session as described herein can be used to transfer any data object from host device 100 to accessory 102; in some embodiments, a buffer transfer session can also be used to transfer data objects from accessory 102 to host device 100; for example, accessory 102 can include a storage device to store data objects, and interface 132 of accessory 102 can have the ability to initiate a buffer transfer session to transfer a selected data object to host device 100.

A buffer transfer session as described herein can be used to transfer a discrete data object (such as a file) whose size is known prior to beginning the transfer. In some embodiments, a buffer transfer session is initiated to transfer a single data object and terminated when transfer of the data object is complete. In other embodiments, one buffer transfer session can be used to transfer multiple data objects sequentially. As described below, in some embodiments, a buffer transfer session is only used for data objects whose size exceeds a certain threshold, as other available data transfer techniques (e.g., a different type of communication session) can be more efficient for transferring smaller data objects. In addition, some embodiments can also provide streaming data sessions to communicate data objects whose size is not known or a data stream that is not readily divisible into discrete objects. Thus, it is not required that host device 100 and accessory 102 use buffer transfer sessions for all data transfers.

Figure 2:
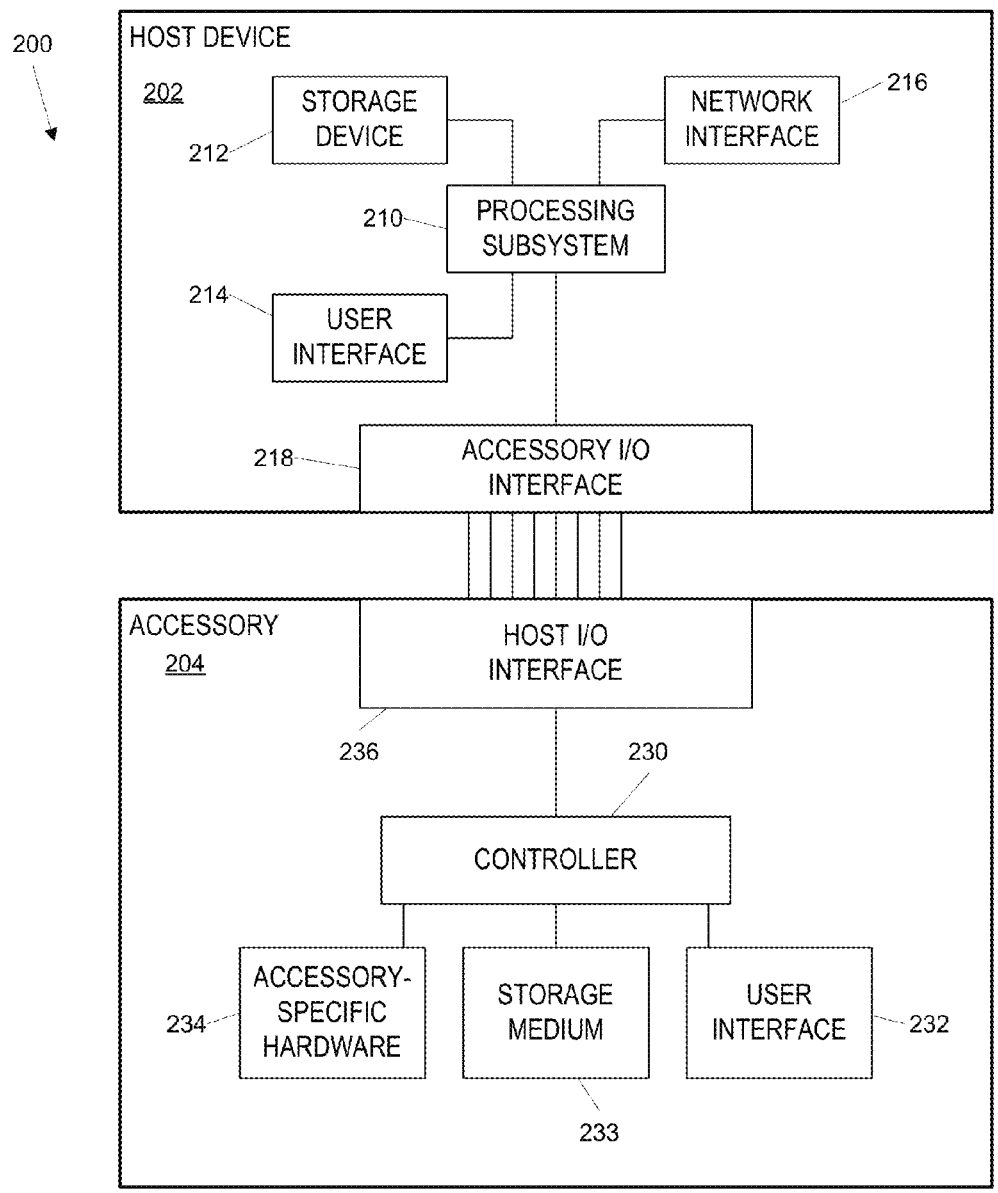
FIG. 2 is a simplified block diagram of a system including a host device and an accessory according to an embodiment of the present invention.

FIG. 2 is a simplified block diagram of a system 200 including a host device 202 and accessory 204 according to an embodiment of the present invention. In this embodiment, host device 202 (e.g., implementing host device 100 of FIG. 1) can provide computing, communication and/or media playback capability. Host device 200 can include processing subsystem 210, storage device 212, user interface 214, network interface 216, and accessory input/output (I/O) interface 218. Host device 202 can also include other components (not explicitly shown) such as a battery, power controllers, and other components operable to provide various enhanced capabilities.

Storage device 212 can be implemented, e.g., using disk, flash memory, or any other non-transitory storage medium, or a combination of media, and can include volatile and/or non-volatile media. In some embodiments, storage device 212 can store data objects such as audio files, video files, image or artwork files, information about a user's contacts (names, addresses, phone numbers, etc.), information about a user's scheduled appointments and events, notes, and/or other types of information. In some embodiments, storage device 212 can also store one or more application programs to be executed by processing subsystem 210 (e.g., video game programs, personal information management programs, media playback programs, etc.).

User interface 214 can include input devices such as a touch pad, touch screen, scroll wheel, click wheel, dial, button, switch, keypad, microphone, or the like, as well as output devices such as a video screen, indicator lights, speakers, headphone jacks, or the like, together with supporting electronics (e.g., digital-to-analog or analog-to-digital converters, signal processors, or the like). A user can operate input devices of user interface 214 to invoke the functionality of host device 202 and can view and/or hear output from host device 202 via output devices of user interface 214.

Processing subsystem 210 can be implemented as one or more integrated circuits, e.g., one or more single-core or multi-core microprocessors or microcontrollers, examples of which are known in the art. In operation, processing system 210 can control the operation of host device 202. In various embodiments, processing subsystem 210 can execute a variety of programs in response to program code and can maintain multiple concurrently executing programs or processes. At any given time, some or all of the program code to be executed can be resident in processing subsystem 210 and/or in storage media such as storage device 212.

Through suitable programming, processing subsystem 210 can provide various functionality for host device 202. For example, in response to a request from accessory 204, processing subsystem 210 can initiate a buffer transfer session to transfer a data object stored in storage device 212 to accessory 204 via accessory I/O interface 218. Processing subsystem 210 can also execute other programs to control other functions of host device 202, including application programs that may be stored in storage device 212; in some embodiments, these application programs may include instructions that generate requests to send or receive data objects, and processing subsystem 210 can initiate a buffer transfer session to service any such requests.

Network interface 216 can provide voice and/or data communication capability for host device 202. In some embodiments network interface 216 can include radio frequency (RF) transceiver components for accessing wireless voice and/or data networks (e.g., using cellular telephone technology, advanced data network technology such as 3G or EDGE, WiFi (IEEE 802.11 family standards), or other mobile communication technologies, or any combination thereof), components for short-range wireless networking (e.g., using Bluetooth standards), GPS receiver components, and/or other components. In some embodiments network interface 216 can provide wired network connectivity (e.g., Ethernet) in addition to or instead of a wireless interface. Network interface 216 can be implemented using a combination of hardware (e.g., driver circuits, antennas, modulators/demodulators, encoders/decoders, and other analog and/or digital signal processing circuits) and software components.

Accessory I/O interface 218 can allow host device 202 to communicate with various accessories. For example, accessory I/O interface 218 can support connections to a computer, an external keyboard, a speaker dock or media playback station, a digital camera, a radio tuner, an in-vehicle entertainment system or head unit, an external video device, a memory card reader, and so on. In some embodiments, accessory I/O interface 218 can include a connector, such as connectors corresponding to the connectors used in various iPod®, iPhone®, and iPad® products, as well as supporting circuitry. The connector can provide connections for power and ground as well as for one or more data communication interfaces such as Universal Serial Bus (USB), FireWire (IEEE 1394 standard), and/or universal asynchronous receiver/transmitter (UART). In some embodiments, the connector provides dedicated power and ground contacts, as well as some number (e.g., four) of programmable digital data contacts that can be used to implement different communication technologies in parallel; for instance, two pins can be assigned as USB data pins (D+ and D−) and two other pins can be assigned as serial transmit/receive pins (e.g., implementing a UART interface); the assignment of pins to particular communication technologies can be negotiated while the connection is being established. In some embodiments, the connector can also provide connections for audio and/or video signals, which may be transmitted to or from host device 202 in analog and/or digital formats. Thus, accessory I/O interface 218 can support multiple communication channels, and a given accessory can use any or all of these channels. In some embodiments, accessory I/O interface 218 can support wireless communication (e.g., via WiFi, Bluetooth, or other wireless protocols) in addition to or instead of wired communication channels.

Accessory 202 (e.g., implementing accessory 102 of FIG. 1) can include controller 230, user interface device 232, storage medium 233, other accessory-specific hardware 234, and host I/O interface 236. Accessory 202 is representative of a broad class of accessories that can interoperate with a host device, and such accessories can vary widely in capability, complexity, and form factor. Various accessories may include components not explicitly shown in FIG. 2, including but not limited to storage devices (disk, flash memory, etc.) with fixed or removable storage media; video screens, speakers, or ports for connecting to external audio/video devices; camera components such as lenses, image sensors, and controls for same (e.g., aperture, zoom, exposure time, frame rate, etc.); microphones for recording audio (either alone or in connection with video recording); and so on. In addition, some accessories may provide an additional interface (not shown) that can connect to and communicate with another accessory.

Controller 230 can include, e.g., one or more single-core or microprocessors and/or microcontrollers executing program code to perform various functions associated with accessory 204. For example, where accessory 230 incorporates a user-operable control (e.g., controls 116 of FIG. 1), controller 230 can interpret user operation of the control and responsively invoke functionality of accessory 202; in some instances, the invoked functionality can include sending information to and/or receiving information from host device 202.

User interface 232 may include user-operable input devices such as a touch pad, touch screen, scroll wheel, click wheel, dial, button, switch, keypad, microphone, or the like, as well as output devices such as a video screen, indicator lights, speakers, headphone jacks, or the like, together with supporting electronics (e.g., digital-to-analog or analog-to-digital converters, signal processors, or the like). Depending on the implementation of a particular accessory 202, a user can operate input devices of user interface 232 to invoke functionality of accessory 202.

Storage medium 233 can incorporate any type of data storage media, including but not limited to disk, flash memory, or any other non-transitory storage medium, or a combination of media, and can include volatile and/or non-volatile media. Storage medium 233 can be used to store program code to be executed by controller 230, data objects received from host device 202, and any other data or instructions that may be generated and/or used in the operation of accessory 204.

Accessory-specific hardware 234 can include any other components that may be present in accessory 202 to enable its functionality. For example, in various embodiments accessory-specific hardware 234 can include one or more storage devices using fixed or removable storage media; GPS receiver; a network interface; power supply and/or power management circuitry; environmental sensors (e.g., temperature sensor, pressure sensor, accelerometer, chemical sensor, etc.); and so on. It is to be understood that any type of accessory functionality can be supported by providing appropriate accessory-specific hardware 234.

Host I/O interface 236 can allow accessory 204 to communicate with host device 202. In accordance with some embodiments of the invention, host I/O interface 236 can include a connector that mates directly with a connector included in host device 202, such as a connector complementary to the connectors used in various iPod®, iPhone®, and iPad® products. Such a connector can be used to supply power to host device 202 and/or receive power from host device 202, to send and/or receive audio and/or video signals in analog and/or digital formats, and to communicate information using one or more data communication interfaces such as USB, UART, and/or FireWire. Other connectors may also be used; for example, host I/O interface 236 can incorporate a standard USB connector and can connect to accessory I/O interface 218 of host device 202 via an adapter cable.

In other embodiments, host I/O interface 236 can support wireless communication (e.g., via WiFi, Bluetooth, or other wireless protocols) in addition to or instead of wired communication channels.

Accessory 204 can be any electronic apparatus that interacts with host device 202. In some embodiments, accessory 204 can provide remote control over operations of host device 202, or a remote user interface that can include both input and output controls (e.g., a display screen to display current status information obtained from host device 202). Accessory 204 in various embodiments can control any function of host device 202 and can also receive data objects from host device 202. In other embodiments, host device 202 can control operations of accessory 204, such as retrieving stored data from a storage medium of accessory 204, initiating an image capture operation by a camera incorporated into accessory 204, etc.

It will be appreciated that the system configurations and components described herein are illustrative and that variations and modifications are possible. The host device and/or accessory may have other capabilities not specifically described herein (e.g., mobile phone, global positioning system (GPS), broadband data communication, Internet connectivity, etc.).

Connectors at the respective I/O interfaces 218, 236 of host device 202 and accessory 204 can be complementary or not as desired. Where two connectors are not complementary, an adapter (not shown) can be provided to connect the two devices. While connectors may be described herein as having pins, a term generally associated with conventional electronic devices having wires to connect components, it is to be understood that other signal paths (e.g., optical signaling) can be substituted. Further, in some embodiments, some of the connections can be wireless, and connectors can be omitted where wireless interfaces are provided.

Further, while the host device and accessory are described herein with reference to particular blocks, it is to be understood that these blocks are defined for convenience of description and are not intended to imply a particular physical arrangement of component parts. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Embodiments of the present invention can be realized in a variety of apparatus including electronic devices implemented using any combination of circuitry and software.

Accessory I/O interface 218 of host device 202 and host I/O interface 236 of accessory 204 allow host device 202 to be connected with accessory 204 and subsequently disconnected from accessory 204. As used herein, a host device and an accessory are "connected" whenever a communication channel is established between their respective interfaces and "disconnected" when the channel is terminated. Such connection can be achieved via direct physical connection, e.g., with mating connectors; indirect physical connection, e.g., via a cable; and/or wireless connection, e.g., via Bluetooth.

In some embodiments, a host device and an accessory can communicate while connected by exchanging messages and data according to an "accessory protocol." The messages and data can be communicated, e.g., using any wired or wireless transport medium provided by the relevant interfaces.

The accessory protocol can define a "universe" of messages that can be exchanged between host device 202 and any accessories connected thereto, such as accessory 204. The message format can include, e.g., a start bit or bit sequence to indicate that what follows is a message code, followed by an actual message code that can be interpreted and acted on by the recipient. At least some of the message codes may have one or more associated parameters defined by the protocol, and a message can include values for any such parameters in addition to the message code. In some instances, the protocol can further specify a behavior for a recipient in the event that a particular parameter associated with a message code is not received or in the event that an unexpected parameter is received with a message code. The number of parameters can be different for different messages, and in some instances, a parameter may have variable length. In some embodiments, the message codes can be defined such that a given message code is valid in only one direction. Other message structures can also be used.

The accessory protocol can also define a format for the exchange of messages. For instance, the accessory protocol may specify that a message is sent using one or more packets, each of which has a header and a payload. The header provides basic information (e.g., a start indicator; length of the packet; packet sequence number; identifier of a session with which the packet is associated, as described below), while the payload provides all or part of the message data. The packet can also include error-detection or error-correction codes as known in the art.

In some embodiments, the messages can be logically grouped into a "general" message set and an "optional" message set. Every accessory and every host device that use the accessory protocol can be required to support at least the general message set. This message set can include messages enabling the host device and the accessory to identify and authenticate themselves to each other and to provide information about their respective capabilities, including which (if any) of the messages in the optional set each supports. For example, the general message set can include a message the accessory can send to the host device to list every message in the optional set that the accessory is capable of sending and every message in the optional set that the accessory is capable of receiving and acting on. The general message set can also include authentication messages that the host device can use to verify the purported identity and capabilities of the accessory (or vice versa), and the accessory (or host device) may be blocked from invoking certain (or all) of the optional messages if the authentication is unsuccessful.

The optional message set can include messages related to various functionality that might or might not be supported in a given accessory. For example, the optional message set can include simple remote messages that allow an accessory to identify a function of the host device to be invoked, remote user interface messages that can be used to obtain information related to replicating all or part of a user interface of a host device on an accessory (thereby supporting a more advanced remote control), messages that allow a user to control a radio tuner in an accessory by operating a host device and/or to control a radio tuner in a host device by operating an accessory, messages that facilitate transfers of data objects between the host device and the accessory (examples of which are describe below), and so on. Any combination of optional messages can be defined in an accessory protocol, and there is no requirement that a given accessory or host device support all (or even any) of the optional messages.

Figure 3:
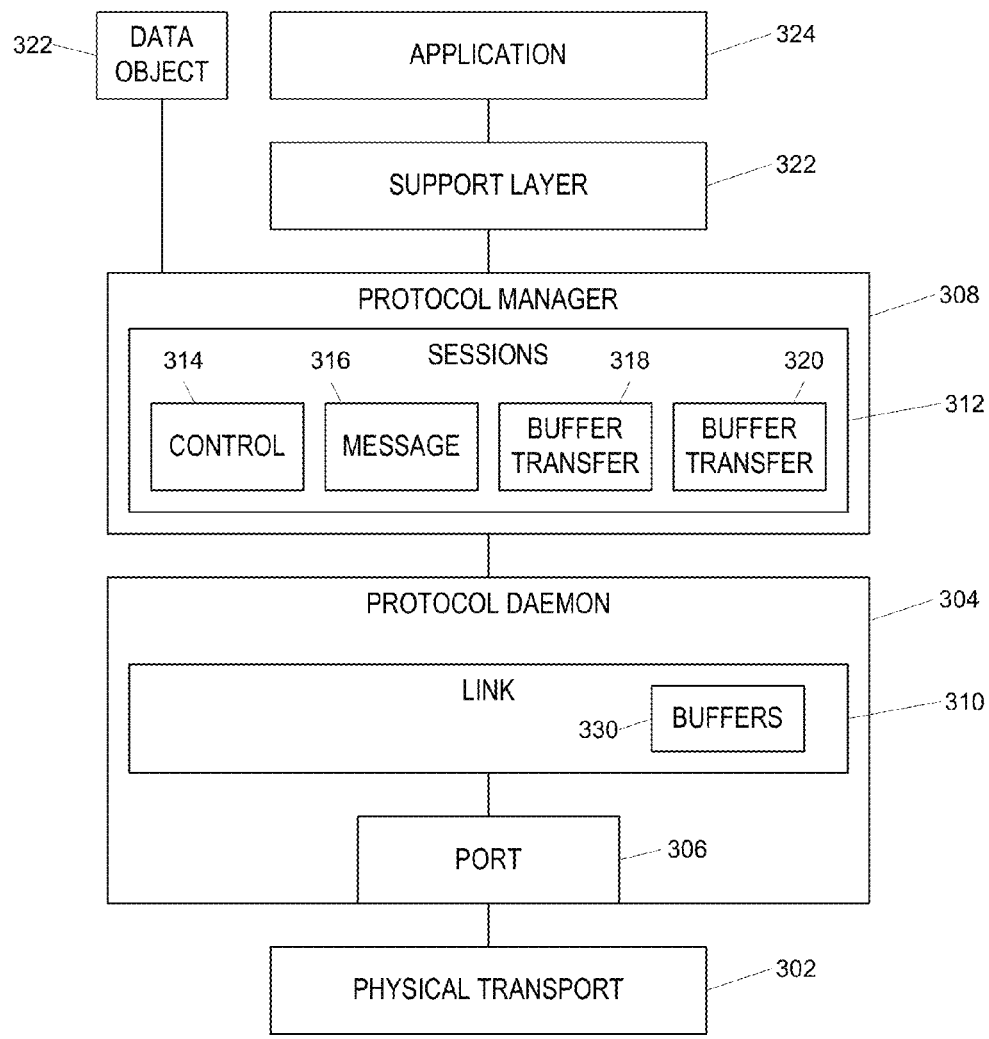
FIG. 3 is a block diagram showing further details of processes within a host device according to an embodiment of the present invention.

FIG. 3 is a block diagram showing further details of processes within host device 202 according to an embodiment of the present invention. The various processes shown can correspond to programs executing in processing subsystem 210 of FIG. 2. In some embodiments, multiple processor chips or multiple processor cores within a single chip can be used to implement the various processes described herein. Some or all of the processors can be programmable general-purpose processors executing software and/or firmware programs; others can be digital signal processors, state machines with built-in functionality, or any combination thereof.

Physical transport 302 can include antennas, signal pins, drivers, digital-to-analog converters, encoders, RF circuitry, and other components operable to send and receive signals on a physical transport, such as a pin or wire, an optical fiber, a wireless transport (e.g., an RF carrier wave), or the like. The particular details depend on the transport, which is a matter of design choice.

Protocol daemon 304 can control accessory protocol communications by managing various physical or logical ports. In some embodiments, protocol daemon 304 can define a port 306 corresponding to each established connection to an accessory. Although only one port 306 is shown, some embodiments allow multiple concurrent connections, and there can be multiple ports 306. Each port 306 can interact with physical transport 302 (which can be the same transport or different transports for different ports 306) to send and receive signals to an accessory connected on that port 306. In some instances, port 306 can be implemented as a software object (e.g., part of the device firmware); in other instances, port 306 can be connected to or associated with suitable communication hardware. Protocol daemon 304 can extract inbound accessory-protocol messages received on port 306 (or any other active ports) and deliver them to a protocol manager 308. Protocol daemon 304 can also receive outbound accessory-protocol messages from protocol manager 308 and provide the messages to port 306 (or another active port) for delivery to an accessory connected to that port 306.

More specifically, protocol daemon 304 can include a link layer 310, which can be implemented as a software object (e.g., part of the device firmware) executing on appropriate hardware. In some embodiments, link layer 310 operates to create, send, receive, and read packets conforming the accessory protocol (e.g., as described above). For outbound communication, link layer 310 can receive a message from protocol manager 308, encapsulate the message into one or more packets, and send the packets via port 306 and physical transport 302. For inbound communication, link layer 310 can receive a packet via port 306, extract the message, and provide the message to protocol manager 308 for processing. Where multiple ports 306 are connected, link layer 310 can manage the interleaving of communication across different connected ports, particularly where multiple ports share a common physical transport (e.g., a wireless transport using an antenna common to all ports).

Protocol manager 308 can receive accessory-protocol messages from protocol daemon 304 and begin the process of interpreting the messages. Protocol manager 308 can receive all messages in the same format, regardless of port; thus the upper levels of the process stack shown in FIG. 3 can be isolated from the transport mechanism. Protocol manager 308 can deliver messages to a support layer 322 that acts as an intermediary between protocol manager 308 (and optionally other low-level device functions) and application 324, or in some instances directly to application 324.

Protocol manager 308 can include a session layer 312, which can be implemented as a software object (e.g., part of the device firmware) executing on appropriate hardware. Session layer 312 can operate to create and read messages conforming to the accessory protocol (e.g., the protocol described above). For outbound communication, session layer 312 can create a message, e.g., based on function calls from support layer 308 or directly from application 324, and provide the message to link layer 310 to be sent. For inbound communication, link layer 310 can provide a message extracted from a packet to session layer 312 for processing. Session layer 312 can interpret the message and send appropriate function calls to protocol manager 308 or directly to application 324.

In some embodiments, session layer 312 can create and define multiple sessions of different types, each adapted to handle different types of messages and data exchanges. Examples are shown in FIG. 3 as sessions 314, 316, 318, and 320. Each session can be assigned a unique session identifier (not shown) such that no two concurrently existing sessions in session layer 312 have the same session identifier. Different sessions can be defined to process different subsets of messages in the accessory protocol, in some embodiments, the subsets can overlap.

A control session 314 can be configured to process all messages associated with the general message set of the accessory protocol, such as identification and authentication of a connected accessory; control session 314 can also determine what other types of sessions are permitted to communicate with the accessory. This determination can be based on accessory identification and authentication, capabilities of the host device and so on.

A message session 316 can be created to handle at least some of the messages from the optional message set of the accessory protocol. For example, most messages may include relatively small amounts of parameters and/or other data, and message session 316 can be used to create and read such messages.

A buffer transfer session 318 can be created when transfer of a data object such as data object 322 is requested. As described below, buffer transfer session 318 can manage the transfer of data object 322 at the object level, leaving the lower-level details to link layer 310. In some embodiments, multiple buffer transfer sessions (e.g., sessions 318 and 320) can coexist to support concurrent transfers of multiple data objects.

Other types of sessions (not shown in FIG. 3) can also be defined. For example, a streaming session can be defined for open-ended data streaming to or from host device 202. Test and diagnostic sessions can also be defined, e.g., for use by developers.

In some embodiments with multiple ports 306, session layer 312 can define a different set of sessions for each connected port. Each session can have a globally unique session identifier (e.g., the control session associated with a first port and the control session associated with a second port can have different identifiers). In some embodiments, each received packet contains a session identifier, and link layer 310 can route extracted messages based on the session identifier; likewise, link layer 310 can route outgoing messages to ports based on the session identifier of the message's source. Link layer 310 can maintain a mapping of session identifiers to ports, and session layer 312 can operate without knowledge of what ports are currently defined. It is to be understood that multiple session identifiers can be mapped to the same port. Where multiple session identifiers are mapped to the same port, link layer 310 can manage the interleaving of communications to and from different sessions, transparently to session layer 312.

For inbound communication, one of the sessions 314, 316, 318, 320 within protocol manager 308 can receive accessory-protocol messages from protocol daemon 304 and begin the process of interpreting the messages. Protocol manager 308 can receive all messages in the same format, regardless of port; thus the upper levels of the process stack shown in FIG. 3 can be isolated from the transport mechanism. Protocol manager 308 can deliver messages to a support layer 322 that acts as an intermediary between protocol manager 308 (and optionally other low-level device functions) and application 324, or in some instances directly to application 324.

Application 324 can include one or more application programs implementing various functions of host device 202. Examples include an interface for navigating a database of media assets and for playing back assets of various types (e.g., audio, video, still images such as photos, etc.). Other examples include World Wide Web browsers, e-mail programs, personal information management applications (e.g., for managing calendar, tasks, contacts, etc.), geographic navigation programs (e.g., using GPS capability where present) and the like. Depending on implementation, application 324 can be part of an operating system of host device 202, a separate program pre-loaded onto host device 202, or a program loaded onto host device 202 by a user.

Some or all of the sessions in session layer 312 can be initiated and terminated on demand. For example, control session 314 can be initiated when a new connection is detected and port 306 is initialized. Control session 314 can be used to process identification and authentication messages received from the accessory and determine whether a message session 316 should be created or not. In some embodiments, control session 314 can remain active until such time as a disconnection of port 306 occurs. Message session 316 can be created in response to control session 314 determining that message session 316 should be created. Once created, message session 316 can remain active until such time as a disconnection of port 306 occurs or until such time as control session 314 determines that message session 316 should be terminated (e.g., because a new identification message is received from the accessory on port 306).

In some embodiments, message session 316 can receive a message from the accessory requesting transfer of data object 322. In response, message session 316 can initiate a buffer transfer session 318 to transfer data object 322. In some embodiments, message session 316 may be prevented from initiating buffer transfer session 318 if control session 314 determines that the connected accessory is not authorized to perform buffer transfers. Buffer transfer session 318, once created, can begin the transfer of data object 322, and can terminate once the transfer is complete. If another transfer is subsequently requested, another buffer transfer session can be created.

It will be appreciated that the processes described herein are illustrative and that variations and modifications are possible. Host device 202 can support any type of application, and applications can be launched or exited under control of a user or another process. It is contemplated that the lower level processes (including support layer 322, protocol manager 308, and protocol daemon 304) can be implemented in software and/or firmware and configured to be automatically started at device power-up and to terminate only on power down or when various abnormal conditions are detected. The processes may go into inactive states to minimize resource consumption when not in use. Further, not all of the levels and processes shown herein are required; for instance, in some embodiments, applications might communicate directly with the protocol manager or protocol daemon. In other embodiments, processes shown as separate in FIG. 3 can be combined.

It is also to be understood that accessory 204 can implement similar processes and devices to those shown in FIG. 3, or any variant thereof. Communication requires that both host device 202 and accessory 204 have suitably configured hardware and/or software components to send and receive messages that are mutually comprehensible (e.g., conforming to the accessory protocol at both the packet level and the message level), but the implementation may be varied as desired.

As noted above, an accessory protocol can contain any number and combination of messages, depending on the functionality to be implemented. In certain embodiments of the present invention, the functionality can include transfer of data objects from the host device to the accessory and/or transfer of data objects from the accessory to the host device using a buffer transfer session. The accessory protocol can include messages to facilitate establishment of a buffer transfer session and transfer of the data object.

Figure 4:
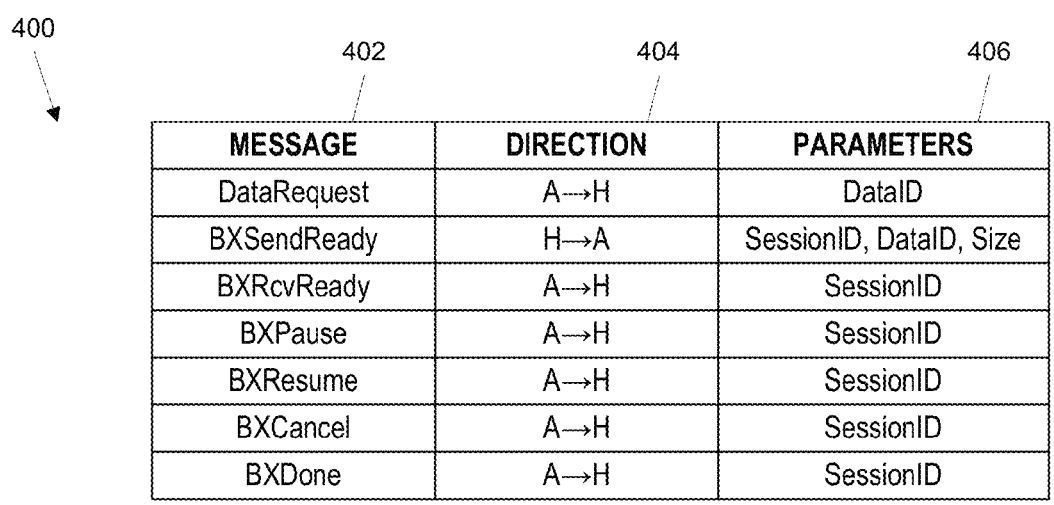
FIG. 4 is a table showing messages that can be sent related to file transfers from a host device to an accessory according to an embodiment of the present invention.

For example, FIG. 4 is a table 400 showing messages that can be sent related to file transfers from a host device to an accessory according to an embodiment of the present invention. These messages can be sent and received, e.g., using the processes of FIG. 3. For each message in column 402, table 400 identifies a direction 404 in which the message is valid (either accessory (A) to host (H) or host to accessory) and associated message parameters 406.

A DataRequest message can be sent from the accessory to the host device to request a particular data object identified by a DataID parameter. The DataID parameter can include any information usable by the host to identify the requested data object, such as a file name, a handle, an index into a lookup table or other data structure where file identifiers are kept, or any other information. Where session layer 312 is implemented in the host device, a DataRequest message can be sent, e.g., to message session 316. In some embodiments, there can be multiple different messages for requesting data objects of different kinds, or for indicating different intended uses of the requested data object.

A BXSendReady message can be sent from the host to the accessory to indicate that a buffer transfer session (e.g., buffer transfer session 318 of FIG. 3) has been initiated on the host and is ready to start sending the data object to the accessory. The BXSendReady message can include the unique session identifier (SessionID) assigned to buffer transfer session 318, the DataID parameter sent by the accessory, and size information for the data object. In some embodiments, the DataID parameter can be omitted, and the accessory can infer the identity of the data object associated with the buffer transfer session based on rules of the accessory protocol. For instance, a protocol rule may specify that if the accessory makes multiple data requests, buffer transfer sessions will be initiated in the order of the requests, or that only one data request can be outstanding at a time. The size information can be specified, e.g., by reference to the number of bytes of data in the data object or the number of packets that will be needed to transfer the entire data object. Referring to FIG. 3, in some embodiments, initiating buffer transfer session 318 includes transferring the data object (or a portion thereof) to a buffer 330 accessible to link layer 310, and the BXSendReady message is sent after this is accomplished.

A BXRcvReady message can be sent from the accessory to the host to indicate that the accessory is ready to receive the data object. For example, upon receiving the BXSendReady message, the accessory may allocate a buffer (or other storage) of appropriate size to receive the data object, associate the allocated buffer with the SessionID of the buffer transfer session, and make any other necessary or desired preparations, then send the BXRcvReady message. In some embodiments, the host does not begin sending the data object until the BXRcvReady message is received. In response to the BXRcvReady message, the host can begin sending the data object.

In some embodiments, the host sends the data object as a sequence of consecutively numbered packets, each labeled with the SessionID of the buffer transfer session in the header. The SessionID label suffices to indicate that the packet contains part of the data object, and the sequence number indicates which part of the data object. Accordingly, a message from the host identifying the transferred portions of the data object as such is not needed; the accessory can assume that after it has sent BXRcvReady, all received packets labeled with the SessionID of the buffer transfer session contain portions of the data file, and the accessory can put the portions in order based on the sequence numbers. This can reduce overhead during data transfer and allow the data object to be transferred more efficiently.

The BXPause, BXResume, and BXCancel messages can be sent by the accessory at any time while the host is sending data-object packets. The BXPause message can be sent to ask the host to suspend sending of additional object-data packets until further notice, and the BXResume message can be sent to ask the host to resume sending after a BXPause. In some embodiments, implementation of pause and resume relies on the link layer to keep track of which packets have been sent and received, as described below.

The BXCancel message can be sent by the accessory while the transfer is in progress to indicate that the accessory no longer requires the data object. On receipt of a BXCancel message, buffer transfer session 318 of FIG. 3 can notify link layer 310 to stop sending packets and to deallocate buffer 330, making it available for other uses. In this instance, link layer 310 does not preserve information indicating the point the transfer operation had reached.

The BXDone message can be sent by the accessory after the entire data object has been received. In response to the BXDone message, buffer transfer session 318 of FIG. 3 can notify link layer 310 to deallocate buffer 330 and can terminate.

It will be appreciated that these messages are illustrative and that variations and modifications are possible. For example, the messages described above pertain to data-object transfers from the host to the accessory. In some embodiments, the same messages or a similar set of messages can be defined to support data-object transfers in the reverse direction (from accessory to host); thus some embodiments can support data-object transfers in either direction or in both directions using buffer transfer sessions as described herein.

Figure 5:
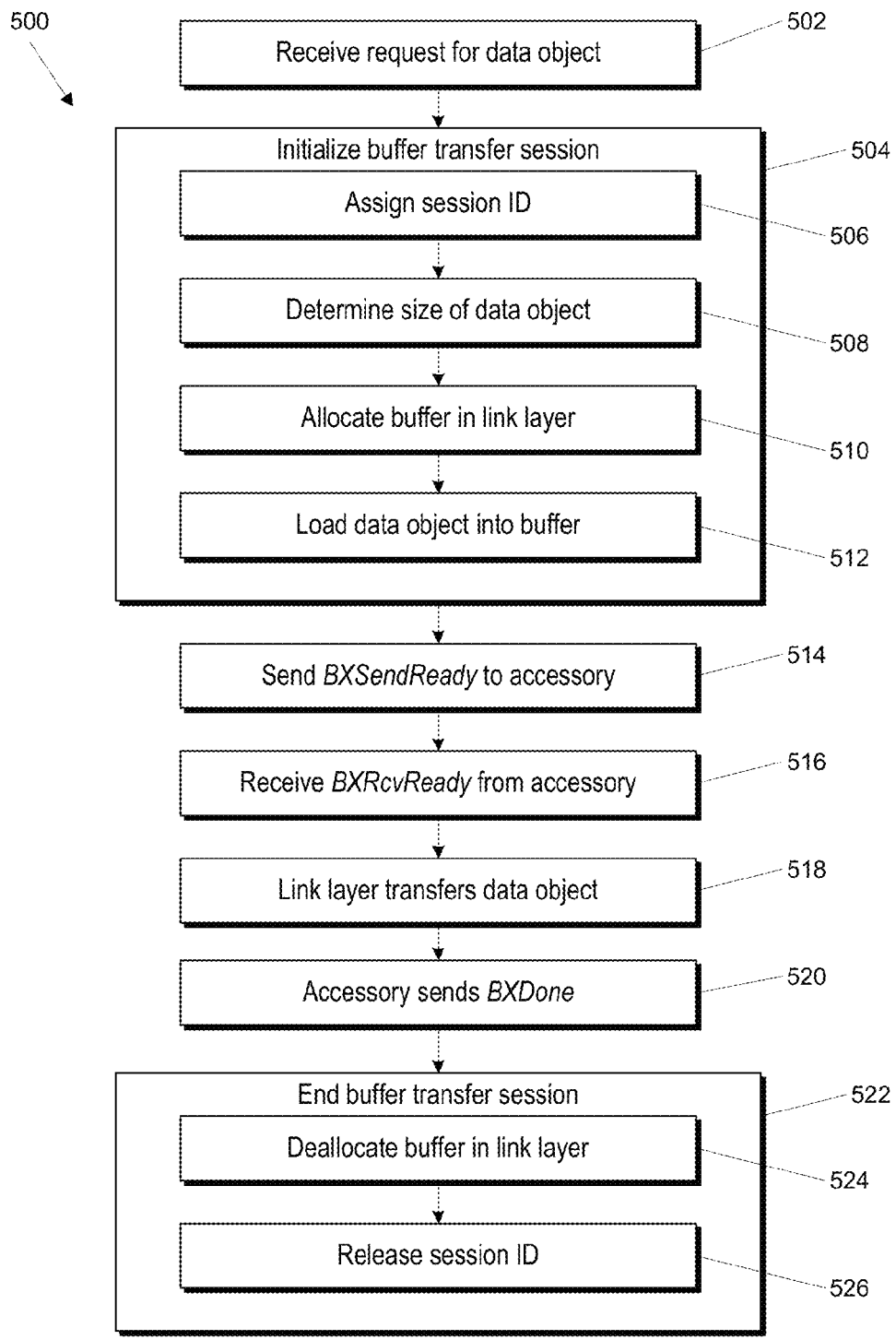
FIG. 5 is a flow diagram of a buffer transfer process for sending a data object according to an embodiment of the present invention.

FIG. 5 is a flow diagram of a buffer transfer process 500 for sending a data object according to an embodiment of the present invention. Process 500 can be implemented, e.g., in host device 200 of FIG. 2 using the software processes shown in FIG. 3.

At block 502, a request for a data object is received at the host device. This request can come from various sources. In some embodiments, the request can be received as a DataRequest message from the accessory as described above with reference to FIG. 4. In some embodiments, an application 324 executing on the host device can determine that a data object should be transferred and send an instruction to protocol manager 308, either directly or via support layer 322. The request can identify the specific data object to be transferred, e.g., data object 322.

At block 504, session layer 312 can initiate buffer transfer session 318 to transfer data object 322. For example, at block 506, a unique session identifier (SessionID) can be assigned to buffer transfer session 318. At block 508, buffer transfer session 318 can determine the size of data object 322. At block 510, session layer 312 can allocate buffer 330 in link layer 310 to temporarily store data object 322 (or portions thereof) pending transfer. At block 512, session layer 312 can load data object 322 (or a first portion thereof) into buffer 330. In some embodiments, data object 322 can be stored locally to host device 200, e.g., in storage device 212. In some embodiments, data object 322 can also be stored remotely and retrieved from its storage location using network interface 216. Loading data object 322 can include copying or moving the data object from its storage location to buffer 330.

At block 514, when data object 322 (or a sufficient portion thereof) has been loaded into buffer 330, buffer transfer session 318 can send a BXSendReady message to the accessory (e.g., via link layer 310). As described above, the BXSendReady message can include the SessionID of buffer transfer session 318, size information for the data object (obtained at block 508), and an identifier of the data object. At block 516, buffer transfer session 318 can receive a BXRcvReady message from the accessory (e.g., via link layer 310); the BXRcvReady message can also include the SessionID of buffer transfer session 318.

At block 518, link layer 310 can transfer the data object. For example, in response to the BXRcvReady message, buffer transfer session 318 can signal link layer 310 to begin generating data packets from buffer 330. Link layer 310 can manage the actual data transfer: generating packets, sending packets, and receiving acknowledgements (Ack packets) or negative-acknowledgements (Nack packets) from the accessory. In some embodiments buffer transfer session 318 can be active during the transfer for other purposes. For instance, if data object 322 is larger than buffer 330, buffer transfer session 318 can monitor the level of unsent data in buffer 330 and transfer additional portions of data object 322 to buffer 330, replacing portions that have been successfully sent. Conventional schemes, such as read and write pointers, can be used to manage the level of unsent data in buffer 330 and to prevent data in buffer 330 from being overwritten before it has been successfully transferred to the accessory. While the transfer is in progress, buffer transfer session 318 can be listening for messages from the accessory, such as the BXPause, BXResume, and BXCancel messages shown in FIG. 4. (Operation of buffer transfer session 318 in relation to these messages is described below with reference to FIG. 8.)

At block 520, when the transfer of data object 322 is complete, the accessory can send a BXDone message as described above. In response to the BXDone message, buffer transfer session 318 can end, or terminate, at block 522. Ending buffer transfer session 318 can include deallocating buffer 330 in link layer 310 (i.e., freeing that resource to be used by other processes) at block 524 and releasing the SessionID of buffer transfer session 318 at block 326 for possible reuse by a different buffer transfer session or a session of a different type.

Figure 6:
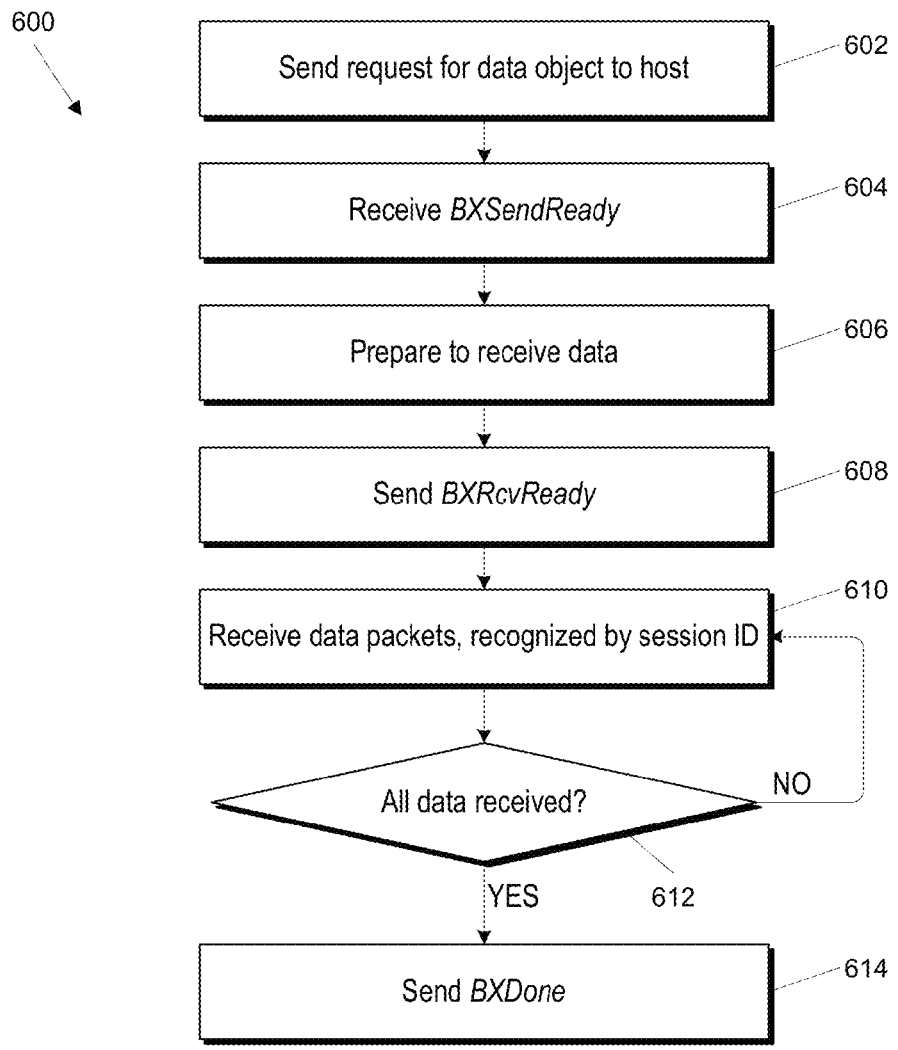
FIG. 6 is a flow diagram of a buffer transfer process for receiving a data object according to an embodiment of the present invention.

FIG. 6 is a flow diagram of a buffer transfer process 600 for receiving a data object according to an embodiment of the present invention. Process 600 can be implemented, e.g., in accessory 204 of FIG. 2 to receive a data object in connection with process 500 executing on host device 202.

At block 602, accessory 204 can send a request for a data object to a host, e.g., host device 202. In some embodiments, the DataRequest message described above can be used. In some embodiments, instead of sending a request, accessory 204 can receive a message indicating that the host proposes to send a data object, and accessory 204 can respond to indicate acceptance.

At block 604, accessory 204 can receive a BXSendReady message from host device 202 or another message indicating that host device 202 is ready to send a data object. As described above, the BXSendReady message can include a SessionID for the buffer transfer session that associated with the transfer. At block 606, in response to the BXSendReady message, accessory 204 can prepare to receive the data object. For example, accessory 204 can allocate a sufficient amount of storage space (e.g., an area within storage medium 233). In some embodiments, accessory 204 can initiate its own buffer transfer endpoint to facilitate management of the transfer. This endpoint can be a session or other software object executing on appropriate hardware. In some embodiments, the buffer transfer endpoint can, for example, store received data into appropriate locations within the allocated storage space based on packet sequence numbers (thereby allowing packets to be received out of order). In some embodiments, the buffer transfer endpoint can also perform data integrity checking on the payloads of received packets, generate acknowledgement or retry packets as appropriate, and so on. In some embodiments, management of the incoming packets can be handled in a link layer that can be similar to link layer 310 described above.

At block 608, when it is ready to begin receiving packets, accessory 204 can send a BXRcvReady message to host device 202. At block 610, accessory 204 can begin to receive data packets from host device 202. As described above, the data packets can include a header identifying them as belonging to the buffer transfer session (e.g., by including the SessionID), a sequence number, and a payload containing a portion of the object being transferred. Accessory 204 can extract the payload from each received packet and store it into the allocated storage area (e.g., an area allocated within storage medium 233); a particular storage location can be selected based on the sequence number, and packets can be received out of order without affecting data integrity. In embodiments where the packet includes error detection codes, accessory 204 can verify data integrity before storing the payload; if the packet includes error correction codes, accessory 204 can correct the data before storing the payload. Accessory 204 can also send Ack (acknowledgement) and Nack (negative-acknowledgement) packets to host device 202. In some embodiments an Ack is sent for every successfully received packet, and a Nack is sent if the packet contained an error. In other embodiments, one Ack is sent after a group of N sequential packets is successfully received (N can be, e.g., 2, 4, 8 or 16), and a Nack is sent if an error is detected; sliding windows or other techniques can be used to manage the sending of and responding to Ack and Nack packets. As noted above, depending on implementation, the generation of Ack and Nack packets can be delegated to a link layer in the accessory.

At block 612, accessory 204 can determine whether the entire data object has been received, e.g., based on the amount of received data and the known size of the data object. If less than the entire data object has been received, process 600 can return to block 610 to continue receiving packets. Once the entire data object has been received, at block 614, accessory 204 can send a BXDone message to host device 202 to confirm delivery.

Figure 7:
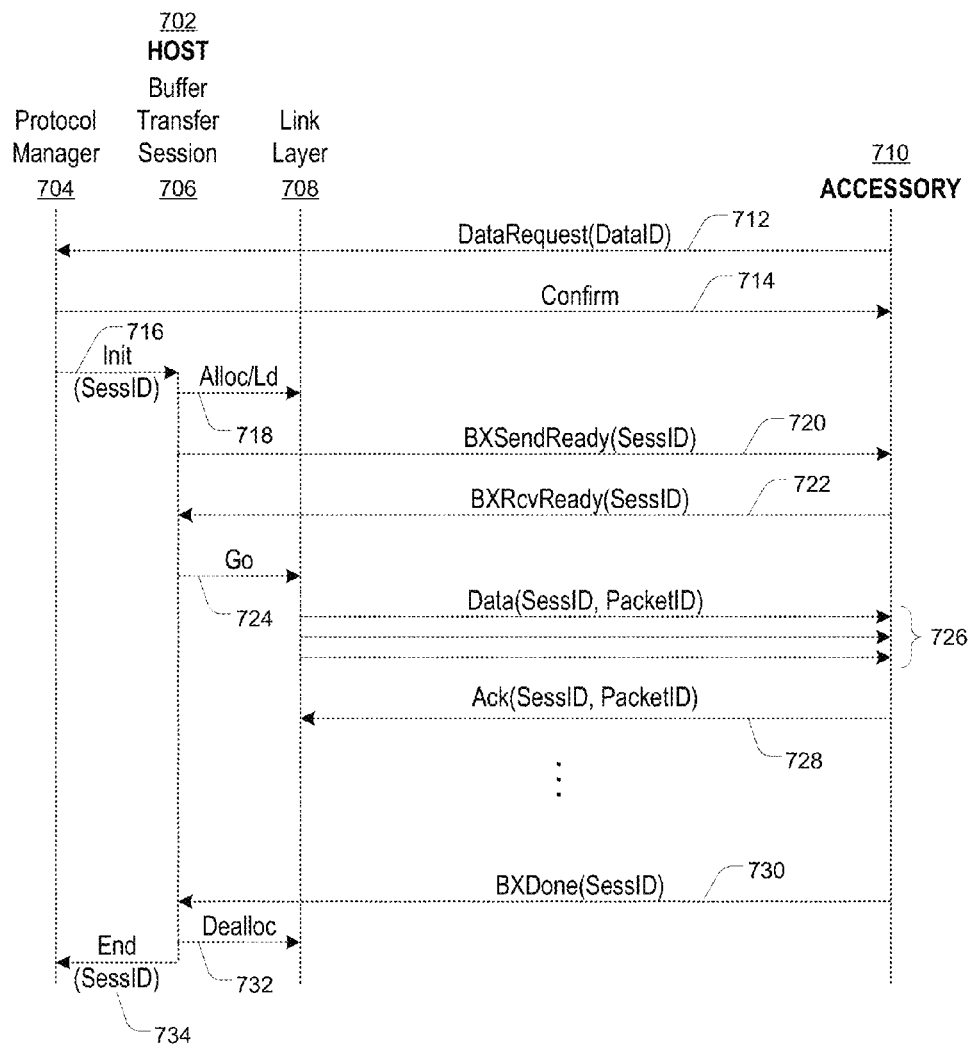
FIG. 7 is a simplified message passing diagram further illustrating a buffer transfer operation according to an embodiment of the present invention.

FIG. 7 is a simplified message passing diagram further illustrating the operation of processes 500 and 600 according to an embodiment of the present invention. In this diagram, time runs vertically and various processes are represented by vertical lines; messages sent between processes are shown as arrows. Host 702 is shown as having processes including a protocol manager 704, a buffer transfer session 706, and a link layer 708; these can be similar to the processes described above with reference to FIG. 3. Accessory 710 is shown as having a single process; it is to be understood that additional processes can be present, e.g., a separate link layer and session layer.

The illustrated message sequence begins with a DataRequest message 712 sent from accessory 704 to host 702, identifying a requested data object. DataRequest message 712 is received by protocol manager 704, which can send a confirmation of intent to transfer the requested data object (message 714) and initiate buffer transfer session 706 (message 716). As indicated by Alloc/Ld signal 718, buffer transfer session 706 allocates a buffer in link layer 708 and loads the requested data object into the buffer. While a single Alloc/Ld signal 718 is shown, it is to be understood that multiple signals can be exchanged within host 702 at this stage and that other processes (not explicitly shown) may participate in preparing host 702 for the transfer.

When host 702 is ready to begin the transfer, BXSendReady message 718 is sent to accessory 704. Accessory 704 prepares to receive the data and, when ready, sends BXRcvReady message 720 to host 702, where it is received by buffer transfer session 706. In response, buffer transfer session 706 can send a Go signal 722 to link layer 708 to initiate sending of packets to transfer the data object.

Transfer of the data object is represented by Data packets 726 and Ack packet 728. Each Data packet 726 can include a packet ID (e.g., a sequence number) and the session identifier (SessID) associated with buffer transfer session 706. As described above, various techniques can be implemented between link layer 708 and accessory 704 to ensure receipt of packets and data integrity. These techniques can include the sending of Ack packets 728 by accessory 704; each Ack packet 728 can acknowledge a single data packet or multiple data packets. Any number of Data packets 726 and Ack packets 728 can be exchanged.

When accessory 704 has received the entire data object, BXDone message 730 can be sent to buffer transfer session 706. Buffer transfer session 706 can respond by instructing link layer 708 to deallocate the buffer (signal 732), after which buffer transfer session 706 can end, indicated by signal 734.

As shown in FIG. 7, a buffer transfer session can be initiated in response to the data request and terminated when transfer is done. A separate link layer can manage the details of the data transfer process without intervention from the buffer transfer session. In some embodiments, the payload of a data packet (e.g., Data packets 726) can consist entirely of data from the data object; the recipient (in this case, accessory 704) can infer that the packets contain object data from the presence of the session identifier in the header and the timing of the packets (i.e., received after the accessory sent BXRcvReady). This can reduce overhead associated with transferring large data objects using packets.

It will be appreciated that the buffer transfer processes described herein are illustrative and that variations and modifications are possible. Steps described as sequential may be executed in parallel, order of steps may be varied, and steps may be modified, combined, added or omitted. For instance, in the embodiments described above, a buffer transfer session is used to transfer a single data object. In other embodiments, a single buffer transfer session can be used to transfer a series of data objects, one after the other, as long as the beginning and/or ending point of each data object can be detected. For example, if multiple data objects are being sent, the host can send the first data object, wait for a BXDone from the accessory, then begin to send the second data object. In some embodiments, prior to sending the second data object, the host can send a second BXSendReady identifying the second data object and wait for a BXRcvReady response from the accessory.

Figure 8:
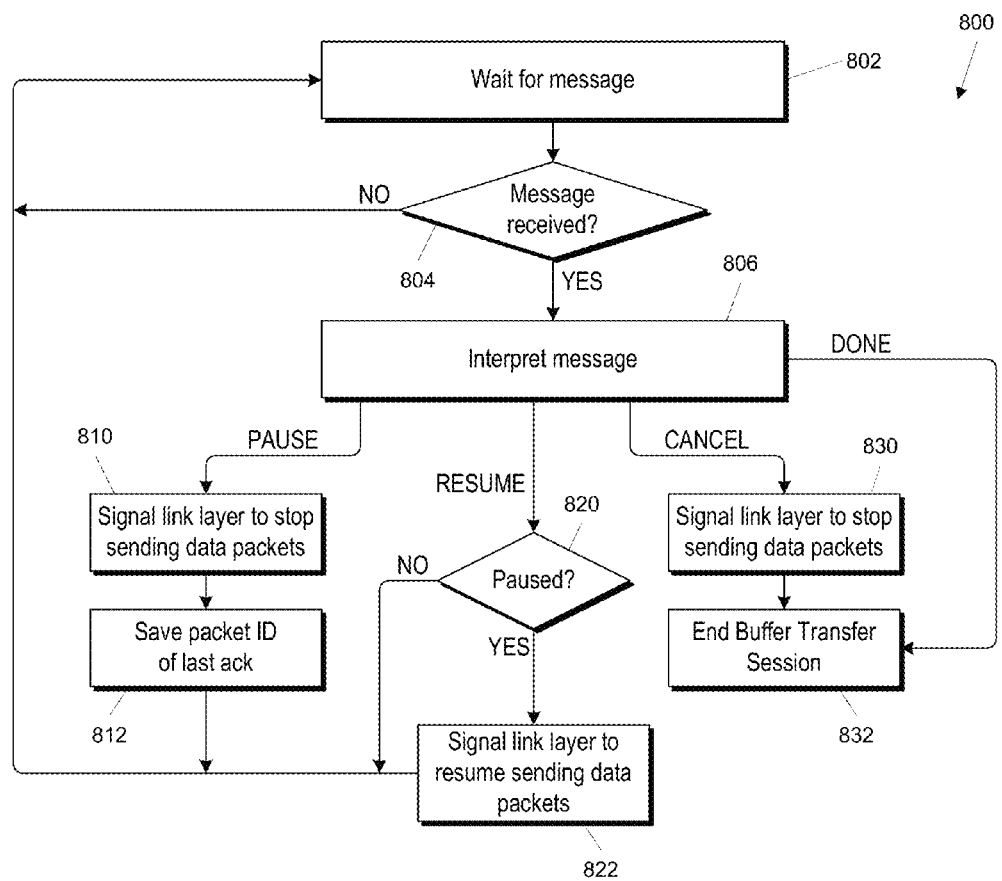
FIG. 8 is a flow diagram of a process that can be implemented to support pausing and resuming a buffer transfer session according to an embodiment of the present invention.

As described above with reference to FIG. 4, in some embodiments, an accessory can request that the host pause, resume or cancel an in-progress buffer transfer. FIG. 8 is a flow diagram of a process 800 that can be implemented, e.g., in buffer transfer session 318 of FIG. 3 according to an embodiment of the present invention. Process 800 illustrates operations that can occur while link layer 310 is generating and sending data packets.

At block 802, process 800 can wait for a message to be received. Messages can be received, e.g., via link layer 310 as described above. At block 804, if no message is received, process 800 can continue to wait until a message is received. At block 806, process 800 interprets the message. In this example, the message can be "pause" (e.g., BXPause message described above), "resume" (e.g., BXResume message described above), "cancel" (e.g., BXCancel message described above), or "done" (e.g., BXDone message described above).

For a pause message, at block 810, process 800 can signal link layer 310 to stop sending data packets. In some embodiments, this signal affects only the sending of data packets related to the buffer transfer session; link layer 310 can continue to send packets associated with other sessions (e.g., message session 316 or control session 314 of FIG. 3). At block 812, buffer transfer session 318 (or link layer 310) can save a packet identifier (e.g., the sequence number) of the last data packet acknowledged by the accessory; this can allow link layer 310 to resume the transfer with little or no repetition. Process 800 can return to block 802 to wait for further messages.

For a resume message, at block 820, process 800 can determine whether the transfer is currently paused (e.g., whether BXPause was the last message received). If not, the resume message can be ignored, and process 800 can return to block 802 to wait for further messages. (In some embodiments, receiving a resume message when the transfer is not paused may be treated as an error, and buffer transfer session 318 can abort the transfer.) At block 822, if the transfer is currently paused, buffer transfer session 318 can instruct link layer 310 to resume sending data packets. In some embodiments, link layer 310 (or buffer transfer layer 318) has saved the identifier of the last acknowledged packet, and the transfer can resume with the next sequential packet after the last acknowledged packet. Process 800 can return to block 802 to wait for further messages.

For a cancel message, at block 830, process 800 can signal link layer 310 to stop sending data packets. As with pause messages, this need not affect the sending of packets associated with other sessions. In this instance, it is assumed that the accessory will not resume the transfer, and no information about the current state of the transfer need be saved. At block 832, buffer transfer session 318 can end. As in the case of successful completion, ending can include deallocating link-layer buffers and releasing the session identifier.

For a done message, process 800 can proceed to block 832 to end the buffer transfer session. (Since the transfer is done, it is assumed that link layer 310 is not sending data packets.)

It will be appreciated that process 800 can include additional options depending on the implementation. Other messages can be received during a transfer; for instance, the accessory can send periodic status messages to the buffer transfer session.

Figure 9:
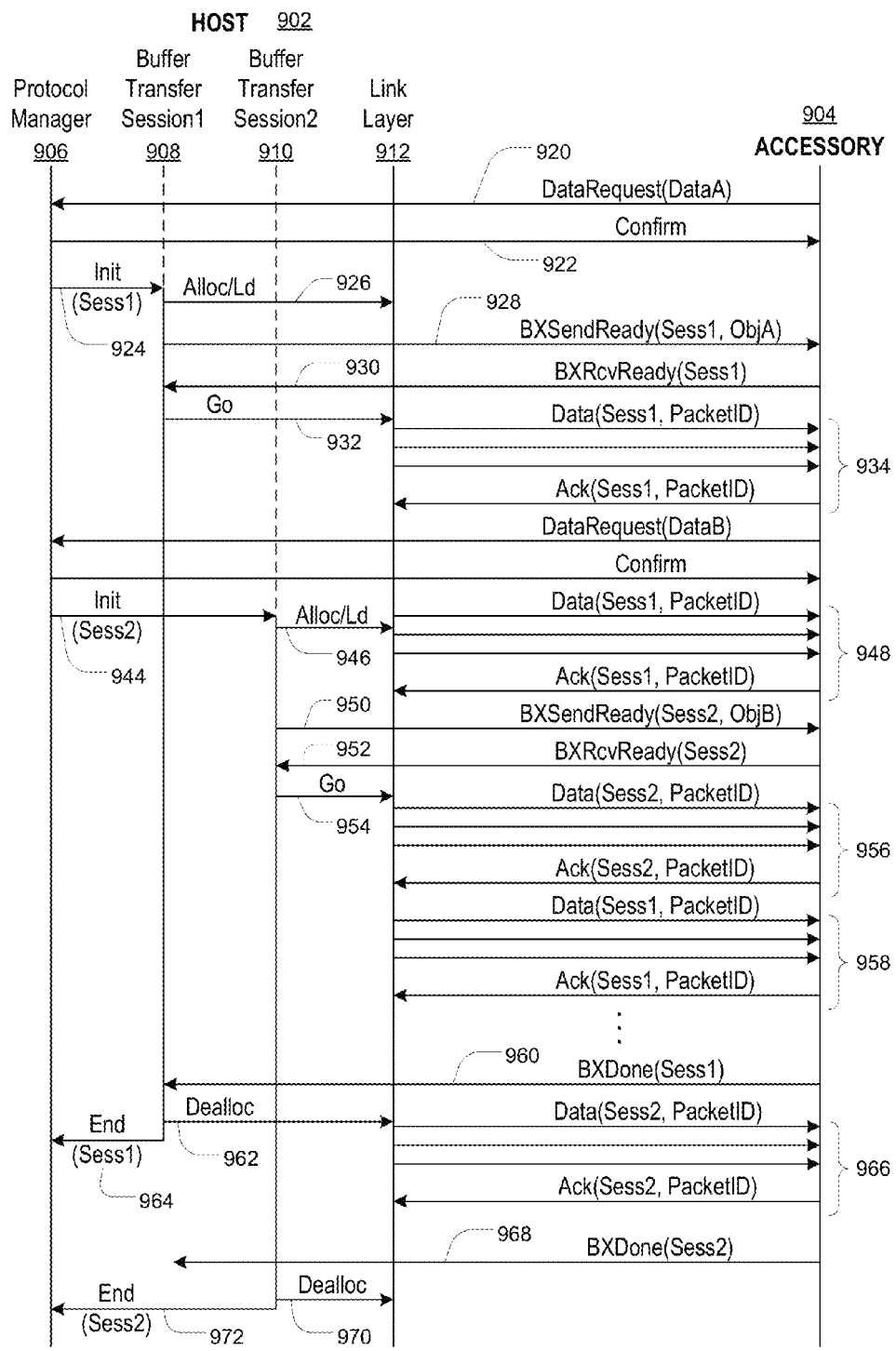
FIG. 9 is a simplified message-passing diagram illustrating concurrent transfers of two data objects from a host device to an accessory according to an embodiment of the present invention.

In some embodiments, multiple data-object transfers can be in progress concurrently, each in a different buffer transfer session. FIG. 9 is a simplified message-passing diagram, similar to FIG. 7, illustrating one such scenario in which two data objects can be transferred from host device 902 to accessory 904 according to an embodiment of the present invention.

The sequence can begin with accessory 904 sending a message 920 to protocol manager 906 of host 904 to request a first data object (ObjA). Protocol manager 906 can respond with a confirmation (message 922) and initiate a first buffer transfer session 908 with a unique identifier (Sess1) as indicated by message 924. Message 926 can be used to allocate a buffer in link layer 912 and prepare for the transfer of the first data object (e.g., as described above). When first buffer transfer session 908 is ready, it can send BXSendReady message 928 to accessory 904, including its session identifier and the identifier of the first data object. Accessory 904 can respond with BXRcvReady message 930. Buffer transfer session 908 can instruct link layer 912 to begin sending packets ("Go" message 932); sending of packets can begin as indicated by Data and Ack messages 934.

Before transfer of the first data object is complete, accessory 904 can send a message 940 to protocol manager 906 to request a second data object (ObjB). Protocol manager 906 can respond with a confirmation (message 942) and initiate a second buffer transfer session 910 with a unique identifier (Sess2) as indicated by message 944. Message 946 can be used to allocate a second buffer in link layer 912 and prepare for the transfer of the second data object (e.g., as described above). While all this is occurring, link layer 912 can continue to send packets for the first data object, as indicated by messages 948.

When second buffer transfer session 910 is ready, it can send BXSendReady message 950 to accessory 904, including its session identifier (Sess2) and the identifier of the second data object (ObjB). Accessory 904 can respond with BXRcvReady message 952; there is no ambiguity with the in-progress first session because the session identifiers are different. After receiving message 952, buffer transfer session 910 can instruct link layer 912 to begin sending packets ("Go" message 954).

At this point, link layer 912 can have two buffer transfers in progress. Data from the two buffer transfers can be interleaved on a single physical transport between host 902 and accessory 904; for instance, any of messages 956 and 958 can be interleaved as desired. In some embodiments, priority logic can be used to determine the relative order between packets from different buffer transfers. In some embodiments, if multiple ports or multiple transports are connected between host 902 and accessory 904 (e.g., as described above with reference to FIG. 3), link layer 310 can route packets for different buffer transfers on different ports or transports.

At the receiving side (accessory 904), data for different objects can be distinguished by reference to the session identifier, which can be included in each packet header as mentioned above. Based on the session identifier, accessory 904 can store the payload of each packet into the appropriate location, thereby assembling two data objects concurrently. Each Ack packet sent by accessory 904 also includes a session identifier, allowing link layer 912 to correctly track which packets have or have not been received for each transfer.

When accessory 904 has received all of the packets for the first data object, it can send BXDone message 960 to host device 902. BXDone message 960 is identified with a specific buffer transfer session (Sess1) and is accordingly processed by buffer transfer session 908 (and not by buffer transfer session 910). Buffer transfer session 908 can deallocate its buffer in link layer 912 (message 962) and end (message 964).

Second buffer transfer session 910 continues, and link layer 912 can continue to send packets for the second data object, as indicated by messages 966.

When accessory 904 has received all of the packets for the first data object, it can send BXDone message 968 to host device 902. BXDone message 968 is processed by buffer transfer session 910 (based on its session identifier). Buffer transfer session 910 can deallocate its buffer in link layer 912 (message 970) and end (message 972).

It will be appreciated that the message sequence of FIG. 9 is illustrative and that variations and modifications are possible. Different messages can be used, and the sequences can be altered. For example, in some instances, a transfer that starts later can finish ahead of a transfer that started earlier, depending on the priority rules, available transports, and sizes of the data objects being transferred. Any number of transfers can be in progress concurrently, subject to limits on the number of concurrent sessions that can be imposed by either the host or the accessory as a matter of design choice; such choices can be based on available resources, desire to complete a transfer quickly, intended usage scenarios, or the like.

In some embodiments, various errors can occur during a buffer transfer. As described above, packet transmission errors can be handled by resending packets. If the error rate becomes too high, some embodiments can abort the transfer (and start over if desired).

It is also possible that the accessory and host can become disconnected during a transfer. For example, referring to FIG. 1, a user may physically disengage connectors 110 and 118 while a transfer is in progress. In the case of a wireless transport, the connection may be lost, e.g., if one device moves out of range of the other or if signal quality otherwise degrades to an unacceptable level. Other events can also cause disconnection. In the event of disconnection, some embodiments of the present invention can simply abort the transfer; when the devices reconnect, the transfer can be restarted from the beginning if desired.

In some embodiments, it may be possible to continue an in-progress transfer without starting over. For example, fallback and/or persistence logic can be implemented. As used herein, fallback is an option when the same accessory is connected on two or more ports. If one port disconnects, the link layer can fall back to another port that is still connected and resume the transfer. Persistence is an option if a fallback port is not available (or if fallback logic is not implemented); under this option, current state information for the in-progress transfer can be saved to persistent storage and accessed when the accessory reconnects, allowing the transfer to resume.

Figure 10:
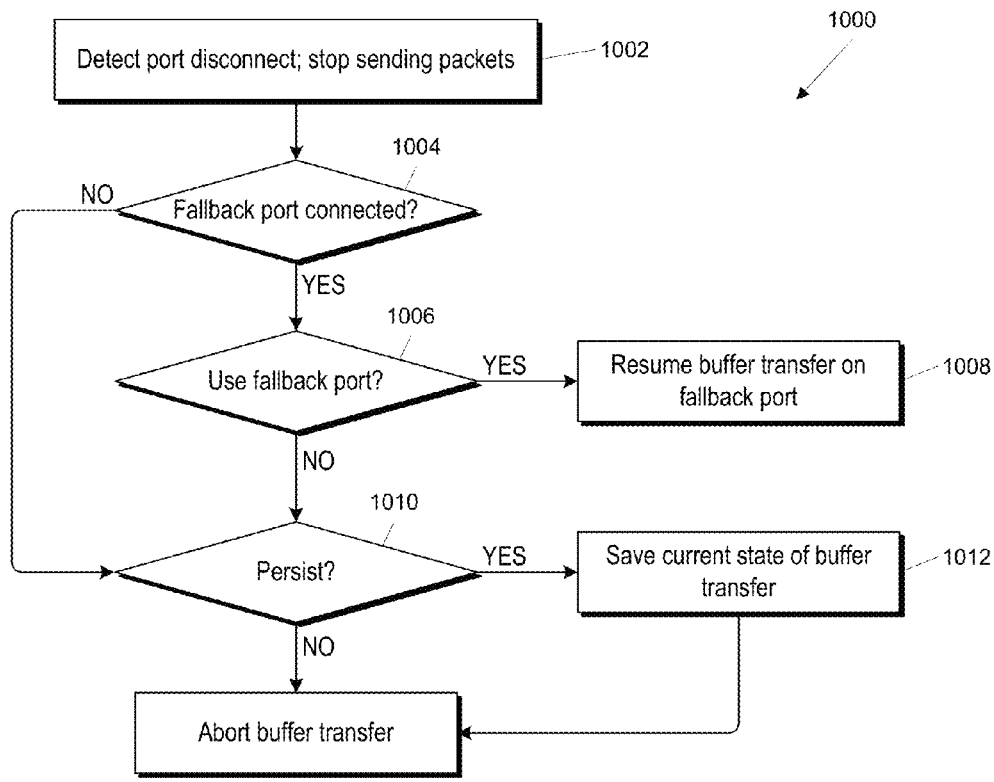
FIG. 10 illustrates a process for providing fallback and persistence options in a buffer transfer session according to an embodiment of the present invention.

FIG. 10 illustrates a process 1000 implementing fallback and persistence according to an embodiment of the present invention. At block 1002, a port disconnect is detected, e.g., in link layer 310, and link layer 310 stops sending packets to the disconnected port. At block 1004, link layer 310 can determine whether a fallback port is connected. For example, in some embodiments, link layer 310 can maintain a port map that includes, for each currently connected port, an identifier of the accessory connected to that port; if the same accessory identifier is associated with two ports in the port map, then either of those two ports can be a fallback port for the other.

If a fallback port is connected, then at block 1006, link layer 310 can determine whether to use the fallback port to continue the buffer transfer operation. For example, link layer 310 can send a special control packet to the accessory via the fallback port, providing information about the in-progress transfer. The accessory can respond by sending a packet via the fallback port: an Ack packet can be used to indicate that the transfer should be resumed on the fallback port, and a Nack packet to indicate that the transfer should not be resumed.

If it is determined at block 1006 that the transfer should continue, then at block 1008 the transfer can resume, using the fallback port. For example, link layer 310 can determine the sequence number of the last packet that was acknowledged before the disconnect and resume with the next sequential packet. The same buffer transfer session identifier can be used, and the change to a new port can be invisible to the buffer transfer session.

If a fallback port is not connected (block 1004) or if it is determined that the transfer should not continue on a fallback port (block 1006), then at block 1010, process 1000 can determine whether the transfer should be persistent. In some embodiments, persistence can be negotiated between the host and the accessory, e.g., during an identification process, or at the time a data-object transfer is requested. If the transfer should be persistent, then at block 1012, current state information for the transfer is saved by the host. This information can include, e.g., an identifier of the data object, the sequence number of the last packet sent (or some other indication of which portions of the data object are known to have been transferred), the session identifier, an identifier of the accessory to which the data object was being transferred, and any other information that can be used to reestablish the transfer when the same accessory reconnects. The state information can be saved to non-volatile storage in the host device so that it is available whenever the accessory reconnects. In some embodiments transfer-state information is saved only for a set period of time (e.g., one day, one week, or 30 days) to prevent accumulation of stale information.

If neither a fallback port nor persistence are available, then at block 1014, the buffer transfer session can be aborted. In this case, the accessory can reconnect and obtain the data object by starting a new transfer operation from the beginning.

Embodiments described herein can provide reliable, efficient transfers of large data objects between two devices. Separating the session layer from the link layer allows for the transfer to be managed at multiple levels: the session layer processes the transfer as a single transaction involving a data object, while the link layer processes the transfer as a sequence of data packets. Further, because there is a point-to-point connection between the sender and the recipient, the link layer can use a very simple packet structure to reduce overhead. For instance, a data packet can include just the following elements: a session identifier, a sequence number, an error detection and/or error correction code, and object data. The packet need not explicitly identify the sender, the recipient, or the data object to which it pertains. The packets can be fixed-length (e.g., a maximum length supported by the port on which they will be sent, in order to minimize the number of packets needed), so payload-length information, while optional, is not required. Additional elements can include a start byte, end byte or similar separator to help the recipient parse a bit stream into packets.

While the invention has been described with respect to specific embodiments, one skilled in the art will recognize that numerous modifications are possible and that features described with specific reference to one embodiment can be applied in other embodiments.

For example, the foregoing description refers to transferring data objects from a host to an accessory. Those skilled in the art will appreciate that the roles can be reversed, and the same techniques can be used to transfer data from the accessory to the host. More generally, the techniques can be used to transfer data between any two devices with a point-to-point connection between them.

Buffer transfer sessions have been described with focus on the sending device. It is to be understood that a receiving device can also implement separate session and link layers. Thus, for example, a receiving device can initiate a buffer transfer session in response to receiving a BXSendReady message, and that session can generate messages such as BXRcvReady and BXDone. At the same time, a link layer in the receiving device can handle the receipt, checking, and acknowledging of data packets; the receiving link layer can route the actual data to the receiving buffer transfer session or simply store it in a buffer and notify the receiving buffer transfer session when the buffer is ready to be read. The receiving buffer transfer session can facilitate moving the data to a longer-term storage location and/or directing the received data object to a consumer process that will make use of it.

In the examples described above, buffer transfer operations can be initiated based on a request from a receiving device. Other events can also result in initiating a buffer transfer operation. For example, an application executing on a first device can determine that the first device is connected to a second device and that the first device should send a particular data object to the second device. The application can instruct the lower layers in the first device to initiate a buffer transfer, while the transfer operation itself can be implemented using techniques described above. Thus, the transfer operation does not dependent on the source of the transfer request.

In some embodiments, buffer transfer sessions are initiated or not based on a determination by the protocol manager of the sending device. For example, when a request to transfer a data object is received, the protocol manager can determine the size of the data object. In some instances, small data objects can be transferred using a message that can be sent using a message session (e.g., session 316 of FIG. 3). Since there can be overhead associated with initializing a buffer transfer session, if the data object is small enough, it may be more efficient to send the data object using the message session. Accordingly, the protocol manager can apply a threshold on the size of data object. For sizes below the threshold, the data object can be sent via the message session; for sizes above the threshold, a buffer transfer session can be used. In some embodiments, the threshold can be determined based on implementation details regarding the overhead associated with establishing a buffer transfer session, the size and transmission rate of the packets, the available resources in the message session to buffer an outgoing data object, and so on.

The present disclosure refers throughout to transfers of data objects, which can be any fixed-size item of data, without limitation as to the size or information content of the data. Further, it is to be understood that "transfer" as used herein refers to providing the data object from a sender to a recipient; depending on implementation, the sender might or might not retain the original data object after the transfer. (Accordingly, "transfer" is to be understood as including both copying and moving of data objects.)

Embodiments of the present invention can be realized using any combination of dedicated components and/or programmable processors and/or other programmable devices. The various processes described herein can be implemented on the same processor or different processors in any combination. Where components are described as being configured to perform certain operations, such configuration can be accomplished, e.g., by designing electronic circuits to perform the operation, by programming programmable electronic circuits (such as microprocessors) to perform the operation, or any combination thereof. Further, while the embodiments described above may make reference to specific hardware and software components, those skilled in the art will appreciate that different combinations of hardware and/or software components may also be used and that particular operations described as being implemented in hardware might also be implemented in software or vice versa.

Computer programs incorporating various features of the present invention may be encoded and stored on various computer readable storage media; suitable media include magnetic disk or tape, optical storage media such as compact disk (CD) or DVD (digital versatile disk), flash memory, and other non-transitory media. (It is understood that "storage" of data is distinct from propagation of data using transitory media such as carrier waves.) Computer readable media encoded with the program code may be packaged with a compatible electronic device, or the program code may be provided separately from electronic devices (e.g., via Internet download or as a separately packaged computer-readable storage medium).

Thus, although the invention has been described with respect to specific embodiments, it will be appreciated that the invention is intended to cover all modifications and equivalents within the scope of the following claims.

What is claimed is:

1. A method for transferring data between a first device and a second device, the method comprising:
   establishing, by the first device, a point-to-point communication link with the second device;
   receiving, at the first device, an instruction to send a first data object to the second device;
   locating, by the first device, the first data object;
   assigning, by the first device, a first unique identifier for a first transfer session;
   sending, by the first device to the second device via the point-to-point communication link, a first send-ready message including the first unique identifier;
   receiving, by the first device from the second device via the point-to-point communication link, a first receive-ready message responsive to the first send-ready message; and
   in response to the first receive-ready message, sending, by the first device to the second device via the point-to-point communication link, a first plurality of packets, each packet in the first plurality of packets including the first unique identifier and a different portion of the first data object, wherein the first plurality of packets includes a number of packets sufficient to transfer the entirety of the first data object and wherein the packets do not include sender device identification or recipient device identification.

2. The method of claim 1 wherein the instruction to send the first data object is received as a data request message from the second device via the point-to-point communication link.

3. The method of claim 1 further comprising:
   while sending the first plurality of packets, receiving, at the first device, an instruction to send a second data object to the second device;
   locating, by the first device, the second data object;
   assigning, by the first device, a second unique identifier for a second transfer session;
   sending, by the first device to the second device via the point-to-point communication link, a second send-ready message including the second unique identifier;
   receiving, by the first device from the second device via the point-to-point communication link, a second receive-ready message responsive to the second send-ready message; and
   in response to the second receive-ready message, sending, by the first device to the second device via the point-to-point communication link, a second plurality of packets, each packet in the second plurality of packets including the second unique identifier and a different portion of the second data object, wherein the second plurality of packets includes a number of packets sufficient to transfer the entirety of the second data object,
   wherein at least some of the first plurality of packets and at least some of the second plurality of packets are interleaved on the point-to-point communication link.

4. The method of claim 1 further comprising:
   while sending the first plurality of packets, receiving, from the second device, a pause message; and
   in response to the pause message, stopping the sending of the first plurality of packets.

5. A method for transferring data from a first device to a second device, the method comprising:
   establishing, by the second device, a point-to-point communication link with the first device;
   receiving, at the second device, a send-ready message from the first device, the send-ready message indicating that the first device is ready to transfer a data object to the second device, the send-ready message including a session identifier for the transfer of the data object;
   sending, by the second device, a receive-ready message to the first device, the receive-ready message indicating that the second device is ready to receive the data object;
   subsequently to sending the receive-ready message, receiving, by the second device, a plurality of packets from the first device, each of the plurality of packets including a header and a payload, the header including the session identifier and a sequence number, wherein each of the plurality of packets has a different sequence number and wherein the packets do not include sender device identification or recipient device identification;
   determining, by the second device, based on the session identifier, that the payload of each of the plurality of packets contains a portion of the data object; and
   storing, by the second device, the payload of each of the plurality of packets in a storage medium, wherein a location for storing the payload of each of the plurality of packets is determined based at least in part on the sequence number of the packet.

6. The method of claim 5 wherein the send-ready message includes information indicating a size of the data object to be transferred, the method further comprising:
   prior to sending the receive-ready message, allocating, by the second device a space in the storage medium large enough to contain the data object, the allocation being based on the information indicating the size of the data object.

7. The method of claim 5 further comprising:
   determining, by the second device, whether all portions of the data object have been received; and
   in response to determining that all portions of the data object have been received, sending, by the second device to the first device, a done message indicating that the transfer is complete.

8. The method of claim 5 wherein each of the plurality of packets includes an error detection code, the method further comprising:

checking, by the second device, each packet of a first subset of the plurality of packets to detect an error, the checking using the error detection code;

sending, by the second device to the first device, an acknowledgement packet in the event that no error is detected in the first subset of the plurality of packets; and sending, by the second device to the first device, a negative-acknowledgement packet in the event that at least one error is detected in the first subset of the plurality of packets.

9. The method of claim 5 further comprising:

subsequently to establishing the connection, sending, by the second device to the first device, a request for the data object, wherein the send-ready message is received in response to the request for the data object.

10. The method of claim 5 further comprising:

while receiving the plurality of packets, sending, by the second device, a pause message to the first device, wherein in response to the pause message, the first devices pauses sending of the plurality of packets; and after sending the pause message, sending, by the second device, a resume message to the first device, wherein in response to the resume message the first device resumes sending of the plurality of packets.

11. An electronic device comprising:

an interface configured to establish a point-to-point communication link with a recipient device; and a processing subsystem coupled to the interface, the processing subsystem configured to:

initiate a plurality of sessions, the plurality of sessions including a buffer transfer session configured to transfer a data object to the recipient device over the point-to-point communication link, each of the plurality of sessions having a unique identifier assigned thereto;

load at least a portion of the data object into a buffer;

send, to the recipient device via the point-to-point communication link, a send-ready message, the send-ready message including the unique identifier assigned to the buffer transfer session;

receive, from the recipient device via the point-to-point communication link, a receive-ready message responsive to the send-ready message; and send a sequence of packets to the recipient device via the point-to-point communication link, in response to the receive-ready message, wherein each of the packets in the sequence includes the unique identifier assigned to the buffer transfer session, a sequence number, and a portion of the data object read from the buffer, wherein the sequence of packets includes a packet corresponding to each portion of the data object and wherein the packets do not include sender device identification or recipient device identification.

12. The electronic device of claim 11 wherein the processing subsystem is further configured to execute an application program and wherein the buffer transfer session is initiated in response to an instruction from the application program to transfer the data object to the recipient device.

13. The electronic device of claim 11 wherein the processing subsystem is further configured to receive, from the recipient device, a request for the data object and wherein the buffer transfer session is initiated in response to receiving the request.

14. The electronic device of claim 11 wherein the electronic device is a portable device.

15. The electronic device of claim 14 wherein the interface includes a connector and the recipient device is an accessory for the portable electronic device that connects to the connector.

16. The electronic device of claim 11 wherein the processing subsystem is further configured to define a link layer and wherein the sending of the sequence of packets is performed by the link layer.

17. An electronic device comprising:

an interface configured to establish a point-to-point communication link with a sender device;

a storage medium configured to store data; and a processing subsystem coupled to the interface and the storage medium, the processing subsystem configured to:

send a request for a data object to the sender device via the point-to-point communication link;

receive, from the sender device via the point-to-point communication link, a send-ready message indicating that the sender device is ready to send the data object the send-ready message including a session identifier associated with transfer of the data object;

send, to the sender device via the point-to-point communication link, a receive-ready message indicating that the electronic device is ready to receive the data object;

receive, from the sender device via the point-to-point communication link, the data object as a sequence of packets generated by the sender device, each packet in the sequence of packets being labeled with the session identifier associated with the transfer of the data object and including a portion of the data object as a payload, wherein the packets do not include sender device identification or recipient device identification; and store the payload of each of the received packets in the storage medium as a portion of the data object.

18. The electronic device of claim 17 wherein each packet in the sequence of packets includes a sequence number and wherein the processing subsystem is further configured to determine a location within the storage medium for storing the payload of each packet based at least in part on the sequence number of the packet.

19. The electronic device of claim 17 wherein the processing subsystem is further configured to:

determine whether a subset of the sequence of patents was received without error;

in the event that the subset was received without error, send an acknowledgement packet to the sender device via the point-to-point communication link; and in the event that the subset was not received without error, send a negative-acknowledgement packet to the sender device via the point-to-point communication link.

20. A non-transitory computer-readable storage medium having program code stored therein, the program code comprising instructions that, when executed by a processing subsystem in an electronic device, cause the processing subsystem to perform a method, the method comprising:

establishing a point-to-point communication link with a recipient device;

determining that a first data object is to be transferred to the recipient device;

initiating a first buffer transfer session to manage the transfer of the first data object to the recipient device, wherein initiating the first buffer transfer session includes assigning a first unique identifier to the first buffer transfer session;

communicating from the first buffer transfer session to the recipient device, via the point-to-point communication link, a message indicating that the first unique identifier is associated with the transfer of the first data object; and sending to the recipient device, via the point-to-point communication link, a first plurality of packets, each packet in the first plurality of packets including the first unique identifier and a different portion of the first data object, wherein the first plurality of packets includes a number of packets sufficient to transfer the entirety of the first data object and wherein the packets do not include sender device identification or recipient device identification.

21. The non-transitory computer-readable storage medium of claim 20 wherein the method further comprises:

determining that a second data object is to be sent to the second device;

initiating a second buffer transfer session to manage the transfer of the second data object to the recipient device, wherein initiating the second buffer transfer session includes assigning a second unique identifier to the second buffer transfer session;

communicating from the second buffer transfer session to the recipient device, via the point-to-point communication link, a message indicating that the second unique identifier is associated with the transfer of the second data object; and sending to the recipient device, via the point-to-point communication link, a second plurality of packets, each packet in the second plurality of packets including the second unique identifier and a different portion of the second data object, wherein the second plurality of packets includes a number of packets sufficient to transfer the entirety of the second data object, wherein the first plurality of packets and the second plurality of packets are interleaved on the point-to-point communication link.

22. The non-transitory computer-readable storage medium of claim 20 wherein sending of the first plurality of packets is performed by a link layer without intervention from the buffer transfer session.

23. The non-transitory computer-readable storage medium of claim 22 wherein the method further comprises:

while sending the first plurality of packets, detecting, at the link layer, that the point-to-point communication link has been lost;

determining, in response to detecting that the point-to-point communication link has been lost, whether the transfer of the first data object should be continued on another point-to-point communication link already established with the same recipient device; and in the event that the transfer of the first data object should be continued, resuming the sending of the first plurality of packets using the other point-to-point communication link.

24. The non-transitory computer-readable storage medium of claim 22 wherein the method further comprises:

while sending the first plurality of packets, detecting, at the link layer, that the point-to-point communication link has been lost;

determining, in response to detecting that the point-to-point communication link has been lost, whether the transfer of the first data object should be resumed later; and in the event that the transfer of the first data object should be resumed later, storing information indicating a current status of the transfer in a storage medium local to the electronic device, wherein the stored information is usable to resume the transfer of the first data object after the point-to-point communication link to the recipient device is reestablished.

* * * * *